(12) United States Patent
Phan Vu et al.

(10) Patent No.: US 12,052,134 B2
(45) Date of Patent: Jul. 30, 2024

(54) IDENTIFICATION OF CLUSTERS OF ELEMENTS CAUSING NETWORK PERFORMANCE DEGRADATION OR OUTAGE

(71) Applicant: EXFO Inc., Québec (CA)

(72) Inventors: Hai Hong Phan Vu, Montreal (CA); Justin Whatley, Montreal (CA); Brigitte Jaumard, Montreal (CA); Tristan Glatard, Outremont (CA); Sylvain Nadeau, Vaudreuil-Dorion (CA)

(73) Assignee: EXFO Inc., Quebec (CA)

( * ) Notice: Subject to any disclaimer, the term of this patent is extended or adjusted under 35 U.S.C. 154(b) by 184 days.

(21) Appl. No.: 17/649,219

(22) Filed: Jan. 28, 2022

(65) Prior Publication Data

US 2022/0247620 A1 Aug. 4, 2022

Related U.S. Application Data

(60) Provisional application No. 63/209,263, filed on Jun. 10, 2021, provisional application No. 63/144,572, filed on Feb. 2, 2021.

(51) Int. Cl.
*H04L 41/08* (2022.01)
*G06N 5/025* (2023.01)
*H04L 41/0631* (2022.01)

(52) U.S. Cl.
CPC ............. *H04L 41/08* (2013.01); *G06N 5/025* (2013.01); *H04L 41/0631* (2013.01)

(58) Field of Classification Search
None
See application file for complete search history.

(56) References Cited

U.S. PATENT DOCUMENTS

| | | |
|---|---|---|
| 5,761,653 A | 6/1998 | Schiefer |
| 7,467,067 B2 | 12/2008 | Marvasti |

(Continued)

FOREIGN PATENT DOCUMENTS

| | | |
|---|---|---|
| CN | 102801587 A | 11/2012 |
| EP | 3648406 A2 | 5/2020 |

(Continued)

OTHER PUBLICATIONS

E. Cuthill and J. McKee, Reducing the bandwidth of sparse symmetric matrices, ACM '69: Proceedings of the 1969 24th national conference, Aug. 1969, pp. 157-172.

(Continued)

*Primary Examiner* — Thu N Nguyen
(74) *Attorney, Agent, or Firm* — McDonnell Boehnen Hulbert & Berghoff LLP

(57) ABSTRACT

An embodiment involves obtaining a tabular data set with columns that characterize items relating to behavior of components of a communication network; constructing a frequent-pattern tree, each node being associated with: (i) an item-name for representing an item, (ii) a count of transactions from a root node of the tree to the respective node, and (iii) node-links that refer to other nodes in the tree that represent items having the same item-name; traversing the tree to identify a set of nodes with counts greater than a predefined support threshold; generating, from the nodes, association-rules that are based on antecedent items associated with a target item; reducing the association-rules by (i) removing the association-rules in which the antecedent items thereof are a superset or subset of the antecedent items of a further association-rule, or (ii) combining the association-rules that have antecedent items that are at least partially disjoint and conditionally dependent.

20 Claims, 14 Drawing Sheets

(56) References Cited

U.S. PATENT DOCUMENTS

| | | | |
|---|---|---|---|
| 7,590,728 | B2 | 9/2009 | Tonnesen |
| 7,617,170 | B2 | 11/2009 | Chesla |
| 7,620,523 | B2 | 11/2009 | Marvasti |
| 7,783,745 | B1 | 8/2010 | Bhargava |
| 7,886,064 | B2 | 2/2011 | Nomura |
| 7,953,685 | B2 | 5/2011 | Liu |
| 8,582,457 | B2 | 11/2013 | Leemet |
| 8,949,677 | B1 | 2/2015 | Brundage |
| 9,026,644 | B2 | 5/2015 | Parker |
| 9,122,602 | B1 | 9/2015 | Jewell |
| 9,172,593 | B2 | 10/2015 | Kane |
| 9,298,538 | B2 | 3/2016 | Marvasti |
| 9,414,247 | B2 | 8/2016 | Huang |
| 9,418,088 | B1 | 8/2016 | Noll |
| 9,516,053 | B1 | 12/2016 | Muddu |
| 9,614,742 | B1 | 4/2017 | Zhang |
| 9,654,361 | B2 | 5/2017 | Vasseur |
| 9,667,521 | B2 | 5/2017 | Pietrowicz |
| 9,727,533 | B2 | 8/2017 | Thibaux |
| 9,729,386 | B2 | 8/2017 | Kiesekamp |
| 9,760,240 | B2 | 9/2017 | Maheshwari |
| 9,853,867 | B2 | 12/2017 | Baccarani |
| 9,900,332 | B2 | 2/2018 | Muddu |
| 9,952,921 | B2 | 4/2018 | Kim |
| 9,961,571 | B2 | 5/2018 | Yang |
| 10,061,637 | B1 | 8/2018 | Halbersberg |
| 10,083,073 | B2 | 9/2018 | Ambichl |
| 10,127,695 | B2 | 11/2018 | Garvey |
| 10,165,457 | B2 | 12/2018 | Fernandez Arboleda |
| 10,198,339 | B2 | 2/2019 | Salunke |
| 10,210,036 | B2 | 2/2019 | Iyer |
| 10,210,038 | B2 | 2/2019 | Sasturkar |
| 10,289,473 | B2 | 5/2019 | Mendes |
| 10,397,810 | B2 | 8/2019 | Yang |
| 10,489,363 | B2 | 11/2019 | Yang |
| 10,515,079 | B2 | 12/2019 | Chamarajnagar |
| 10,637,744 | B2 | 4/2020 | Carroll |
| 10,686,681 | B2 | 6/2020 | Medas |
| 10,708,344 | B1 | 7/2020 | Zhao |
| 10,715,391 | B2 | 7/2020 | Rahman |
| 10,771,313 | B2 | 9/2020 | Tedaldi |
| 10,867,036 | B2 | 12/2020 | Komarek |
| 11,032,303 | B1 | 6/2021 | Efstathopoulos |
| 11,138,163 | B2 | 10/2021 | Mdini |
| 2002/0143659 | A1* | 10/2002 | Keezer ............... G06Q 30/0641 |
| | | | 707/E17.116 |
| 2004/0260694 | A1 | 12/2004 | Chaudhuri et al. |
| 2005/0003827 | A1 | 1/2005 | Whelan |
| 2005/0216241 | A1 | 9/2005 | Entin |
| 2007/0055662 | A1 | 3/2007 | Edelman |
| 2013/0097463 | A1 | 4/2013 | Marvasti |
| 2013/0110761 | A1 | 5/2013 | Viswanathan et al. |
| 2013/0262656 | A1 | 10/2013 | Cao |
| 2015/0019916 | A1 | 1/2015 | Kane |
| 2016/0021173 | A1 | 1/2016 | Tapia |
| 2016/0072599 | A1 | 3/2016 | Kariyappa et al. |
| 2016/0183109 | A1 | 6/2016 | Kiesekamp |
| 2016/0241429 | A1 | 8/2016 | Froehlich |
| 2016/0253366 | A1 | 9/2016 | Hsu |
| 2017/0004166 | A1 | 1/2017 | Biem |
| 2017/0085456 | A1 | 3/2017 | Whitner |
| 2017/0147930 | A1 | 5/2017 | Bellala et al. |
| 2017/0161131 | A1 | 6/2017 | Noll |
| 2017/0207948 | A1 | 7/2017 | Ratakonda |
| 2017/0302554 | A1 | 10/2017 | Chandrasekaran |
| 2017/0331673 | A1 | 11/2017 | Iyer |
| 2018/0034685 | A1 | 2/2018 | Naous |
| 2018/0039555 | A1 | 2/2018 | Salunke |
| 2018/0046926 | A1 | 2/2018 | Achin et al. |
| 2018/0063142 | A1 | 3/2018 | Ashiya et al. |
| 2018/0107695 | A1* | 4/2018 | Yang ................... G06F 16/2465 |
| 2018/0150756 | A1* | 5/2018 | Wu ......................... G06N 5/046 |
| 2018/0219889 | A1 | 8/2018 | Oliner |
| 2018/0276063 | A1 | 9/2018 | Mendes |
| 2018/0285685 | A1 | 10/2018 | Singh |
| 2018/0300737 | A1 | 10/2018 | Bledsoe et al. |
| 2018/0308001 | A1 | 10/2018 | Doddala |
| 2019/0102718 | A1 | 4/2019 | Agrawal |
| 2019/0124099 | A1 | 4/2019 | Matselyukh |
| 2019/0132250 | A1 | 5/2019 | Horn |
| 2019/0149396 | A1 | 5/2019 | Zafer |
| 2019/0163551 | A1 | 5/2019 | Cheriton |
| 2019/0165988 | A1 | 5/2019 | Wang |
| 2019/0260764 | A1 | 8/2019 | Humphrey |
| 2020/0059800 | A1 | 2/2020 | Menon et al. |
| 2020/0082013 | A1 | 3/2020 | Triplet et al. |
| 2020/0136891 | A1 | 4/2020 | Mdini |
| 2020/0167393 | A1 | 5/2020 | Gottlob |
| 2020/0167786 | A1* | 5/2020 | Kursun ................... H04L 63/08 |
| 2020/0183946 | A1 | 6/2020 | Pelloin |
| 2020/0278972 | A1 | 9/2020 | Zhou |
| 2021/0006453 | A1 | 1/2021 | Dutta |
| 2021/0014107 | A1 | 1/2021 | Mijumbi |
| 2021/0117863 | A1 | 4/2021 | Soleimani et al. |
| 2021/0110294 | A1 | 5/2021 | Elewitz et al. |
| 2021/0136098 | A1 | 5/2021 | Stergioudis et al. |
| 2021/0184958 | A1 | 6/2021 | Kolar et al. |
| 2021/0250222 | A1 | 8/2021 | Boussac |
| 2021/0385331 | A1 | 12/2021 | Kovvali |
| 2023/0308461 | A1 | 9/2023 | Flysher et al. |

FOREIGN PATENT DOCUMENTS

| | | |
|---|---|---|
| EP | 3764592 A1 | 1/2021 |
| EP | 3849142 A1 | 7/2021 |
| EP | 3866395 A1 | 8/2021 |
| JP | 4721362 B2 | 7/2011 |
| WO | 2012113436 A1 | 8/2012 |
| WO | 2014040633 A1 | 3/2014 |
| WO | 2016169616 A1 | 10/2016 |
| WO | 2017172541 A1 | 10/2017 |
| WO | 2017220107 A1 | 12/2017 |
| WO | 2018188733 A1 | 10/2018 |

OTHER PUBLICATIONS

Non-final office action dated Jan. 4, 2023 for U.S. Appl. No. 17/835,467, 9 pages.

Rodriguez-Perez Raquel et al: "Interpretation of machine learning models using shapley values: application to compound potency and multi-target activity predictions" Journal of Computer-Aided Molecular Design, Springer Netherlands, NL, vol. 34, No. 10, May 2, 2020 (May 2, 2020), pp. 1013-1026, XP037228335, ISSN: 0920-654X, DOI: 10.1007/S10822-020-00314-0 [retrieved on May 2, 2020] the whole document.

Rohit Saluja et al: "Towards a Rigorous Evaluation of Explainability for Multivariate Time Series", arxiv.org, Cornell University Library, 201 Olin Library Cornell University Ithaca, NY 14853, Apr. 6, 2021 (Apr. 6, 2021), XP081936276, the whole document.

Extended European Search Report for EP 22185033.2, dated Dec. 5, 2022 (12 pages).

Non-final office action dated Aug. 16, 2022 for U.S. Appl. No. 16/708,605, 34 pages.

Office Action for U.S. Appl. No. 17/172,472 dated Jun. 28, 2022, 26 pages.

Ahsan Mominul et al: "Developing Computational Intelligence for Smart Qualification Testing of Electronic Products", IEEE Access, IEEE, USA, vol. 8, Jan. 17, 2020 (Jan. 17, 2020), pp. 16922-16933, XP011769063, DOI: 10.1109/ACCESS.2020.2967858 [retrieved on Jan. 27, 2020] p. 16924, paragraph II.—p. 16928, paragraph IV.B.

Stoyanov Stoyan et al: "Predictive analytics methodology for smart qualification testing of electronic components", Journal of Intelligent Manufacturing, Springer US, New York, vol. 30, No. 3, Jan. 18, 2019 (Jan. 18, 2019), pp. 1497-1514, XP036709788, ISSN: 0956-5515, DOI: 10.1007/S10845-018-01462-9 [retrieved on Jan. 18, 2019] p. 1499, paragraph Methodology and computational approach—p. 1504.

Extended European Search Report for EP 22191328.8, dated Feb. 13, 2023 (8 pages).

(56) References Cited

OTHER PUBLICATIONS

Non-final office action dated Apr. 19, 2022 for U.S. Appl. No. 16/708,605, 26 pages.
Shapley, L. S., Notes on the n-Person Game—II: The Value of an n-Person Game, U.S. Air Force Project Rand, Research Memorandum, Aug. 21, 1951.
Shapley, L. S., A Value for n-Person Games, Mar. 18, 1952.
Fisher, Walter D., On Grouping for Maximum Homogeneity, Journal of the America Statistical Association, Dec. 1958, vol. 53, No. 284, pp. 789-798.
Lipovetsky et al., Analysis of regression in game theory approach, Applied Stochastic Models in Business and Industry, Appl. Stochastic Models Bus. Ind., 2001: 17:319-330 (DOI: 10.1002/asmb. 446).
Matsui et al., NP-completeness for calculating power indices of weighted majority games, Theoretical Computer Science 263 (2001) 305-310.
Strumbelj et al., An Efficient Explanation of Individual Classifications using Game Theory, Journal of Machine Learning Research 11 (2010) 1-18.
Rashmi et al, DART: Dropouts meet Multiple Additive Regression Trees, 2015, pp. 489-497.
Chen et al, XGBoost: A Scalable Tree Boosting System, 2016, 785-794.
Ribeiro et al, "Why Should I Trust You?" Explaining the Predictions of Any Classifier, 2016.
Ke et al, LightGBM: A Highly Efficient Gradient Boosting Decision Tree, 31st Conference on neural Inforamtion Processing Systems (NIPS 2017), 1-9.
Lundberg et al, Explainable machine-learning predictions for the prevention of hypoxaemia during surgery, Nat Biomed Eng. Oct. 2018; 2(10) 749-760.
Janzing et al., Feature relevance quantification in explainable AI: A causal problem, Proceedings of the 23rd International Conference on Artificial Intelligence and Statistics 2020., vol. 108.
Sundararajan et al., The Many Shapley Values for Model Explanation, Proceedings of the 37th International Conference on Machine Learning, Online, PMLR 119, 2020.
Lundberg, Scott, Explainable AI for Science and Medicine; slides from YouTube presentation, May 21, 2019, available at https://www.youtube.com/watch?v=B-c8tlgchu0.
Data Presentation How to cite Plotly, 2015 citation, citation formats retrieved from citebay.com/how-to-cite/plotly/ Aug. 23, 2022.
Molnar, Christoph, Interpretable Machine Learning, A Guide for Making Black Box Models Explainable, Creative Commons Attribution-NonCommercial-ShareAlike 4.0 International License, Feb. 21, 2019.
Interpreting random forests, Diving into data, A blog on machine learning, data mining and visualization, Oct. 19, 2014.
Gall, Richard, Machine Learning Explainability vs Interpretability: Two concepts that could help restore trust in AI, 2018 retrieved from https://www.kdnuggets.com/2018/12/machine-learning-explainability-interpretability-ai.html.
Virtanen et al, SciPy 1.0: nature methods, Perspective, fundamental algorithms for scientific computing in Python, vol. 17, Mar. 2020, 261-272.
Kozyrkov, Cassie, What's the difference between analytics and statistics? Google on Sep. 6, 2019 in Analytics, Explained, Statistics, retrieved from https://www.kdnuggets.com/2019/09/difference-analytics-statistics.html.
European Search Report for 19206600.69-1216 dated Apr. 29, 2020.
European Search Report for 19205083.9-1216 / 3648406 dated May 20, 2020.
Non-Final Office Action, U.S. Appl. No. 16/659,874, mailed Dec. 23, 2021, 17 pages.
3GPP, 3rd Generation Partnership Project; Technical Specification Group Services and System Aspects; Telecommunication management; Charging management; Charging Data Record (CDR) parameter description Release 15), Dec. 2018, TS 32.298 V15.5.1.
Agrawal et al., Mining association rules between sets of items in large databases, May 1993, in Proceedings of the 1993 ACM SIGMOD international conference on Management of data (SIGMOD '93). Association for Computing Machinery, New York, NY, USA, 207-216. [Online], [retrieved on Feb. 12, 2021], Retrieved from the Internet <URL: https://doi.org/10.1145/170035.170072>.
Alipio Jorge, Hierarchical Clustering for thematic browsing and summarization of large sets of Association Rules, 2004 SIAM International Conference on Data Mining, Orlando, Florida.
Alzira Faria, A Methodology for Filtering Association Rules. Revista de Ciencias da Computacao II, 2 (Jan. 2007), 14-25.
Azevedo et al., Comparing Rule Measures for Predictive Association Rules, in Machine Learning: ECML 2007, Online], [retrieved on Feb. 2, 2021], Retrieved from the Internet <URL: https://doi.org/10.1007/978-3-540-74958-5 47>.
Brauckhoff et al., Anomaly extraction in backbone networks using association rules, Proceedings of the 9th ACM SIGCOMM conference on Internet measurement, pp. 28-34, Nov. 4, 2009, [Online], [retrieved on Feb. 12, 2021], Retrievec rom the Internet <URL: https://hal.archives-ouvertes.fr/hal-00527139/document >.
Brin et al., Dynamic Itemset Counting and Implication Rules for Market Basket Data. SIGMOD 1997 Arizona USA, Rec J6, 2 (Jun. 1997), 255-264.
Chen et al., Failure Diagnosis Using Decision Trees, May 2004, in International Conference on Autonomic Computing, 2004. Proceedings. IEEE, 36-43 New York, NY, USA.
Cuthill E. and McKee J., Reducing the Bandwidth of Sparse Symmetric Matrices, Naval Ship Research and Development Center, Washington.
Decker et al., Classification in Marketing Research by Means of LEM2-generated Rules, 2007, Department of Business Administration and Economics, Bielefeld University, Germany.
Dimopoulos et al., Identifying the Root Cause of Video Streaming Issues on Mobile Devices, Dec. 1-4, 2015, DOI: http://dx.doi.org/10.1145/2716281.2836109, Heidelberg, Germany.
Dranab Ghosh, "Time Series Seasonal Cycle Detection with Auto Correlation on Spark" retrieved from: hllps:// kghosh.wordpress.com/2018/12/23/lime-series-seasonal-cycle-detection-with-auto-correlation-on-spark/.
E. J. Khatib, Data analytics and knowledge discovery for root cause analysis in LTE self-Organizing networks, PhD dissertation, 2017, University of Malaga.
Fortes et al., Context-Aware Self-Healing: User Equipment as the Main Source of Information for Small-Cell Indoor Networks, Feb. 24, 2016, IEEE vehicular technology magazine, DOI: 10.1109/MVT.2015.2479657, IEEE.
Fortes et al., Contextualized indicators for online failure diagnosis in cellular networks, Apr. 4, 2015, Computer Networks 82 (2015) 96-113, Elsevier B.V., Spain.
Fortes et al., Location-based distributed sleeping cell detection and root cause analysis for 5G ultra-dense networks 2016, 2016:149, DOI 10.1186/s13638-016-0649-6, EURASIP Journal on Wireless Communications and Networking.
Gardner et al., Alarm correlation and network fault resolution using the Kohonen self-organising map., GLOBECOM 1997. IEEE Global Telecommunications Conference. Conference Record, vol. 3. IEEE, 1398-1402. IEEE, Phoenix, r;z.
Gogoi et al., Efficient Rule Set Generation using Rough Set Theory for Classification of High Dimensional Data, 2011 International Journal of Smart Sensors and Ad Hoc Networks (IJSSAN) ISSN No. 2248-9738 (Print) vol. 1, Issue-2.
Gomez-Andrades et al., Automatic Root Cause Analysis for LTE Networks Based on Unsupervised Techniques, Apr. 2016, IEEE Transactions on Vehicular Technology, vol. 65, No. 4, DOI: 10.1109/TVT.2015.2431742, IEEE.
Han et al., Mining Frequent Patterns without Candidate Generation: A Frequent-Pattern Tree Approach. Data Mining nd Knowledge Discovery 8, 1 (Jan. 2004), 53-87.[Online], [retrieved on Feb. 2, 2021], Retrieved from the Internet <URL: https://doi.org/10.1023/B:DAMI.0000005258.31418.83>.
Han J. and Kamber M. Data Mining Concepts and Techniques (second edition), 2006 by Elsevier Inc.

(56) References Cited

OTHER PUBLICATIONS

Hanemann, A Hybrid Rule-Based/Case-Based Reasoning Approach for Service Fault Diagnosis, available on May 13, 2019, Leibniz Supercomputing Center, Munich, Germany.

Hermann Wietgrefe, Investigation and practical assessment of alarm correlation methods for the use in GSM Access networks, NOMS 2002. IEEE/IFIP Network Operations and Management Symposium. 'Management Solutions or the New Communications World'(Cat. No. 02CH37327). IEEE, 391-403. ). IEEE, Florence, Italy.

Imran et al., Challenges in 5G: How to Empower SON with Big Data for Enabling 5G, Nov./Dec. 2014, EEE Network, IEEE.

Jin et al., Nevermind, the Problem Is Already Fixed: Proactively Detecting and Troubleshooting Customer DSL Problems, Nov. 30-Dec. 3, 2010, ACM 1-4503-0448-1/10/11, Philadelphia, USA.

Karn Rupesh Raj et al., Dynamic Autoselection and Autotuning of Machine Learning Models for Cloud Network Analytics, DOI 10.1109!TPDS.2018.2876844, IEEE Transactions on Parallel and Distributed Systems, vol. 30, Issue: 5, May 1, 2019, pp. 1052-1064, Oct. 19, 2018.

Khatib et al., Data mining for fuzzy diagnosis systems in LTE networks, Jun. 1, 2015, Expert Systems with Applications 42 (2015) 7549-7559, Elsevier Ltd., Spain.

Klaine et al., A Survey of Machine Learning Techniques Applied to Self-Organizing Cellular Networks, Jul. 12, 2017, doi:10.1109/COMST.2017.2727878, IEEE Communications Surveys and Tutorials.

Leifler, Comparison of LEM2 and a Dynamic Reduct Classification Algorithm, Masters Thesis, Oct. 9, 2002, LITH-IDA-EX-02-93, Artificial Intelligence & Integrated Computer Systems Division, Dept. of Computer and Information Science, Linkopings universitet.

Leskovec et al., Mining of Massive Datasets (2nd ed.), 2014, Cambridge University Press, USA.

Lin et al., Fast Dimensional Analysis for Root Cause Investigation in a Large-Scale Service Environment, Proceedings Jf the ACM on Measurement and Analysis of Computing Systems 4, 2 (Jun. 2020), 1-23., arXiv: 1911.01225 version: 2 [Online], [retrieved on Feb. 2, 2021] Retrieved from the Internet <URL: https://doi.org/10.1145/3392149>.

Liu et al. Integrating Classification and Association Rule Mining, From: KDD-98 Proceedings. Copyright © 1998, American Association for Artificial Intelligence (www.aaai.org). Department of Information Systems and Computer Science National University of Singapore.

Liu et al., GA-AdaBoostSVM classifier empowered wireless network diagnosis, 2018, 2018:77, https://doi.org/10.1186/s13638-018-1078-5 EURASIP Journal on Wireless Communications and Networking.

M. Demetgul, Fault diagnosis on production systems with support vector machine and decision trees algorithms, 2013, the International Journal of Advanced Manufacturing Technology 67, 9-12 (2013), 2183-2194. ISBN: 0268-3768, Springer Verlag. Nov. 23, 2012.

M. Mdini, A. Blanc, G. Simon, J. Barotin and J. Lecoeuvre, "Monitoring the network monitoring system: Anomaly Detection using pattern recognition," 2017 IFIP/IEEE Symposium on Integrated Network and Service Management, Lisbon, 2017, pp. 983-986.

Maha Mdini, Gwendal Simon, Alberto Blanc, and Julien Lecoeuvre, Introducing an Unsupervised Automated Solution or Root Cause Diagnosis in Mobile Networks, IEEE Transactions on Network and Service Management, vol. 17, No. 1, Mar. 2020.

Mahapatro et al., Fault Diagnosis in Wireless Sensor Networks: A Survey, 2013, IEEE Communications Surveys & Tutorials, vol. 15, No. 4, DOI: 10.1109/SURV.2013.030713.00062, IEEE.

Mahimkar et al, Towards Automated Performance Diagnosis in a Large IPTV Network, Aug. 17-21, 2009, ACM 978-1-60558-594-9/9/08, Barcelona, Spain.

Mahimkar et al., Rapid Detection of Maintenance Induced Changes in Service Performance, Dec. 6-9, 2011, ACM 978-1-4503-1041-3/11/0012, Tokyo, Japan.

Maimon, O and Rokach L. Data Mining and Knowledge Discovery Handbook (second edition) Springer Science+Business Media, LLC 2005, 2010. DOI 10.1007/978-0-387-09823-4.

Mdini et al., ARCD: a Solution for Root Cause Diagnosis in Mobile Networks. 14th International Conference on Network and Service Management (CNSM), Nov. 2018, Roma, Italy. hal-01962869. 978-3-903176-14-0 2018 IFIP.

Mdini et al., Introducing an Unsupervised Automated Solution for Root Cause Diagnosis in Mobile Networks, 2019, EEE, Transactions on Network and Service Management DOI: 10.1109/TNSM.2019.2954340, IEEE.

Mdini et al., Monitoring the Network Monitoring System: Anomaly Detection using Pattern Recognition, IMT Atlantique and Astellia, France.

Mdini M., Root Cause Diagnosis, Nov. 22, 2017, Astellia.

Mdini, Anomaly detection and root cause diagnosis in cellular networks. Artificial Intelligence [cs.AI]. Ecole nationale superieure Mines-Telecom Atlantique, 2019. English. NNT: 2019IMTA0144. tel-02304602.

Mdini, Create your own Artificial Intelligence to monitor your Linux System! Europython, Edinburg Jul. 23-29, 2018.

Mdini, Maha, Anomaly Detection and Root Cause Diagnosis in Cellular Networks, Oct. 2019, retrieved from https//tel.archives-ouvertes.fr/tel-02304602.

Mdini, Maha, Monitoring the Network Monitoring System: Anomaly Detection using Pattern Recognition, Cellular Networks Feb. 22, 2017.

Mi et al., Toward Fine-Grained, Unsupervised, Scalable Performance Diagnosis for Production Cloud Computing Systems, Jun. 2013, IEEE Transactions on Parallel and Distributed Systems, vol. 24, No. 6, DOI: 10.1109/TPDS.2013.21, IEEE Computer Society.

Monge et al. Reasoning and knowledge acquisition framework for 5G network analytics, Oct. 21, 2017, Sensors.

Moysen et al., A Reinforcement Learning based solution for Self-Healing in LTE networks, 2014, 978-1-4799-4449-1/14, IEEE.

Munoz et al., A method for identifying faulty cells using a classification tree-based UE diagnosis in LTE, 2017, 2017:130, DOI 10.1186/s13638-017-0914-3, EURASIP Journal on Wireless Communications and Networking.

Nagaraj et al., Structured Comparative Analysis of Systems Logs to Diagnose Performance Problems, available May 23, 2019, Purdue University.

Ong et al., A Manufacturing Failure Root Cause Analysis in Imbalance Data Set Using PCA Weighted Association Rule Mining, Aug. 11, 2015, Penerbit UTM Press, Melaka, Malaysia.

Palacios et al., Automatic feature selection technique for next generation self-organizing networks, IEEE Communications Letters, vol. 22, No. 6, Jun. 2018. Digital Object Identifier 10.1109/LCOMM.2018.2825392.

Palacios et al., Combination of multiple diagnosis systems in Self-Healing networks, Jul. 22, 2016, Expert Systems With Applications 64 (2016) 56-68, Elsevier Ltd., Spain.

Perri et al. Abductive logic programs with penalization: semantics, complexity and implementation, arXiv preprint cs/0310047 (2003). Theory and Practice of Logic Programming 5, 1-2 (2003), 123-159.

Qu et al., Multilevel Pattern Mining Architecture for Automatic Network Monitoring in Heterogeneous Wireless Communication Networks, Jun. 2016, China communications 13, No. 7: 108-116,Sep. 2, 2016 DOI: 10.1109/CC.2016.7559082.

Reali G. and Monacelli L., Definition and Performance Evaluation of a Fault Localization Technique for an NGN IMS Network, IEEE Transactions on Network and Service Management, vol. 6, No. 2, Jun. 2009. DOI 10.1109/TNSM.2009.090605. Downloaded on Jan. 31, 2022 at 20:51:52 UTC from IEEE Xplore.

Sampath et al. Failure diagnosis using discrete-event models. IEEE transactions on control systems technology 4, 2 1996), 105-124. ISBN: 1063-6536 Publisher: IEEE.

Shvachko et al., The hadoop distributed file system. In Symposium on mass storage systems and technologies (MSST). IEEE, Incline Village, NV, USA, 1-10, 2010.

Steinder et al., A survey of fault localization techniques in computer networks, Jul. 1, 2004, Science of Computer Programming 53 (2004) 165-194, United States.

(56) References Cited

OTHER PUBLICATIONS

H. Phan-Vu, B. Jaumard, T. Glatard, J. Whatley and S. Nadeau, "A Scalable Multi-factor Fault Analysis Framework for Information Systems," in 2021 IEEE International Conference on Big Data (Big Data). Orlando, FL, USA, 2021 pp. 2621-2630. doi: 10.1109/BigData52589.2021.9671747.

Tan et al., Introduction to Data Mining, Pearson New International Edition (First Edition). Pearson Education Limited 2014 ISBN 10: 1-292-02615-4 ISBN 13: 978-1-292-02615-2.

Tan et al., Selecting the right objective measure for association analysis. Information Systems 29, 4 (2004). 293-313., Elsevier, Department of Computer Science, University of Minnesota, 200 Union Street SE, Minneapolis, MN 55455, USA.

Toivonen et al., Pruning and Grouping Discovered Association Rules, 1995, Department of computer Science, University of Helsinki, Finland.

Van Melle et al., Rule-based expert systems: the EMYCIN experiments of the Stanford Heuristic Programming Project, Chapter 15, EMYCIN: A knowledge Engineer's Tool for Constructing Rule-Based Expert Systems, 1984, CUMINCAD. Addison Wesley, Reading, MA.

Van Melle W., Rule-based expert systems: the MYCIN experiments of the Stanford Heuristic Programming Project, Chapter 4, the Structure of the MYCIN System, 1984, CUMINCAD. Addison Wesley, Reading, MA.

Wang et al., An Algorithm for Mining of Association Rules for the Information Communication Network Alarms Based on Swarm Intelligence, Hindawi Publishing Corporation, Mathematical Problems in Engineering, vol. 2014, Article ID 894205, 14 pages, Jan. 1, 2014 [Online], [retrieved on Feb. 12, 2021] Retrieved from the Internet <URL: https:/www. hindawi.com/journals/mpe/2014/894205/abs/>.

Xu et al., Industrial Big Data for Fault Diagnosis: Taxonomy, Review, and Applications, Sep. 19. 2017, IEEE Access, vol. 5, DOI: 10.1109/ACCESS.2017.2731945, IEEE.

Ye et al., Board-level functional fault diagnosis using multikernel support vector machines and incremental learning. IEEE Transactions on Computer-Aided Design of Integrated Circuits and Systems vol. 33, No. 2 (2014), 279-290. ISBN: 0278-0070 Publisher: IEEE.

Zaharia et al., Spark Cluster computing with working sets. In Proceedings of the 2nd USENIX Conference on Hot Topics in Cloud Computing (HotCloud'10), vol. 10. USENIX Association, USA, 2010.

Zawawy et al., Requirements-driven root cause analysis using Markov logic networks. In International Conference on Advanced Information Systems Engineering. CAISE 2012, LNCS 7328, pp. 350-365, 2012, Springer-Verlag Berlin Heidelberg 2012.

Zhang et al., On Assuring End-to-End QoE in Next Generation Networks: Challenges and a Possible Solution, Jul. 2011, 0163-6804/10, IEEE Communications Magazine.

Zheng et al., 3-Dimensional Root Cause Diagnosis via Co-analysis, Sep. 18-20, 2012, ACM 978-1-4503-1520-3/12/09, San Jose, USA.

M. Solé, V. Muntés-Mulero, A. I. Rana, and G. Estrada, "Survey on Models and Techniques for Root-Cause Analysis," arXiv:1701.08546 [cs], Jul. 2017, arXiv: 1701.08546.

P. K. Novak, N. Lavrač, and G. I. Webb, "Supervised descriptive rule discovery: A unifying survey of contrast set, emerging pattern and subgroup mining," *J. Mach. Learn. Res.*, vol. 10, p. 377-403, Jun. 2009.

T. Hulsen, J. de Vlieg, and W. Alkema, "BioVenn—a web application for the comparison and visualization of biological lists using area-proportional Venn diagrams," *BMC genomics*, vol. 9, No. 1, pp. 1-6, 2008.

A. Strehl, G. Gupta, and J. Ghosh, "Distance based clustering of association rules," in *Intelligent Engineering Systems Through Artificial Neural Networks (Proceedings of ANNIE* 1999), vol. 9, No. 1999. ASME Press, 1999, pp. 759-764.

A. Aghasaryan, E. Fabre, A. Benveniste, and R. Boubour, "A Petri net approach to fault detection and diagnosis in distributed systems. II. Extending Viterbi algorithm and HMM techniques to Petri nets," in *Proceedings of the 36th IEEE Conference on Decision and Control*, 1997.

* cited by examiner

FIG. 2

Runtime to generate association rules in seconds.

| Method | 3G dataset | | | |
|---|---|---|---|---|
| | Number of rules | Number of items | Avg. length of antecedent | Diversity (# items/ # rules) | Total impact (%) |
| Before filtering | 107,147 | 218 | 7.31 | $2 \times 10^{-3}$ | 100.00 |
| FB filtering | 285 | 90 | 3.56 | 0.31 | 100.00 |
| HC filtering | N/A | N/A | N/A | N/A | N/A |
| FAR filtering | 11 | 15 | 3.55 | 1.36 | 99.98 |
| CS filtering | 59 | 66 | 3.27 | 1.11 | 100.00 |
| CS filtering @ top10 | 10 | 11 | 1.90 | 1.10 | 82.97 |

FIG. 3E

| Method | 4G dataset | | | |
|---|---|---|---|---|
| | Number of rules | Number of items | Avg. length of antecedent | Diversity (# items/ # rules) | Total impact (%) |
| Before filtering | 511 | 78 | 4.10 | 0.15 | 54.50 |
| FB filtering | 146 | 33 | 4.03 | 0.23 | 54.50 |
| HC filtering | 30 | 31 | 5.33 | 1.03 | 51.28 |
| FAR filtering | 20 | 14 | 4.45 | 0.70 | 38.84 |
| CS filtering | 42 | 29 | 3.97 | 0.69 | 50.79 |
| CS filtering @ top10 | 10 | 15 | 4.10 | 1.50 | 29.82 |

FIG. 3F

IDENTIFICATION OF CLUSTERS OF ELEMENTS CAUSING NETWORK PERFORMANCE DEGRADATION OR OUTAGE

CROSS-REFERENCE TO RELATED APPLICATIONS

The present application claims priority to U.S. Provisional Patent Application No. 63/209,263, filed Jun. 10, 2021 and U.S. Provisional Patent Application No. 63/144,572, filed Feb. 2, 2021, the contents of each of which are hereby incorporated by reference.

BACKGROUND

Root cause analysis techniques can be used to probe information systems for problems. Many approaches for root cause analysis exist, ranging from rule-based to more recent statistical systems and applications using machine learning.

Classical deterministic root cause analysis techniques use domain knowledge to create expert systems that require hand-crafted rules and features. Statistical methods can be applied more generally, are often more robust to changes, and can provide good results. However, both classical and statistical strategies suffer when presented with high dimensional data. Classical expert systems can be computationally efficient, but experts cannot detect all possible rules with an expert system and, consequently, important patterns of failure can be missed.

Although machine learning is an interesting avenue in that it can capture more complex, non-linear relationships in data, most applications of machine learning for root cause analysis suffer from low interpretability or require one hot encoding representations that are infeasible in high cardinality data. Simple machine learning (i.e., statistical) models, commonly referred to as white-box algorithms for their interpretability, will not capture complex relationships between many data points. More complex machine learning models do capture complex relationships, but are commonly referred to as black-box models because they are difficult to interpret.

Frequent pattern mining (FPM) techniques are of interest for categorical values that are prevalent in structured tabular data common in telecom networks (e.g., call data records, session data records), for their ability to handle large cardinality, big data while producing concrete and verifiable measurements in a deterministic way.

Recently, high computational availability has led to the advent of multi-variable fault correlation. An open-source framework for this kind of association learning is the SPARK FP-Growth platform. This platform works to form associate rules, which include a set of antecedent features associated to a single consequent feature, along with confidence, support, lift, and impact measures that gauge the quality of the associate rules. One of the main drawbacks of this strategy is that it produces unfocused results looking for any possible patterns in the data, which has limited utility for a root cause diagnosis system. In most applications, only rules with sufficiently high support and confidence, both statistical measures in associate rule learning, are kept. This can lead to a situation where either too many or too few rules are obtained.

SUMMARY

An objective of automatic root cause diagnosis (ARCD) embodiments herein is to identify the relevant faulty elements and clusters of elements contributing to network (e.g., telecommunication or Internet) performance degradation or outages. It can be beneficial to reduce the need for hard coded parameters by forming element-outcome associations. An avenue to achieve this objective is to discover problematic clusters through pattern mining and clustering strategies to better understand feature interactions between input features and how these ultimately relate to network degradation.

A combination of FPM and filtering techniques are used herein to associate clusters of inputs (e.g. categorical properties, key performance indicators (KPIs), etc.) with outcomes reflecting network performance (e.g., dropped calls). This has resulted in a greatly reduced computation time in identifying clusters of elements associated with network performance degradation. Further, this strategy offers much better scaling to large datasets than previous work on root cause diagnosis. The techniques described herein may be employed particularly in the context of network communication (e.g., telecommunication or Internet communication) or more broadly in other contexts. For example, the techniques described herein may: (1) highlight components and/or interactions that are resulting in communication errors; (2) be scalable such that a variety of problem complexities can be handled; (3) provide an assisted generation model (e.g., can be combined with some a priori information about causal components of the underlying system when reviewing the results); or (4) produce results that can be readily interpreted and/or modeled by system operators.

Accordingly, an example embodiment may include obtaining a tabular data set with columns that respectively characterize items relating to behavior of components of a communication network, wherein records within the tabular data set represent events in the communication network. The example embodiment may further include constructing a frequent-pattern tree, wherein each respective node is associated with: (i) an item-name for representing an item in the tabular data set, (ii) a count of transactions from a root node of the frequent-pattern tree to the respective node, and (iii) node-links that refer to other nodes in the frequent-pattern tree that represent items having the same item-name. The example embodiment may further include traversing the frequent-pattern tree in a bottom-up fashion to identify, as part of frequent patterns, a set of nodes with counts greater than a predefined support threshold. The example embodiment may further include selecting a target item of the items. The example embodiment may further include generating, from the set of nodes, association-rules that are based on antecedent items associated with the target item. The example embodiment may further include reducing the association-rules by (i) removing the association-rules in which the antecedent items thereof are a superset or subset of the antecedent items of a further association-rule, or (ii) combining two or more of the association-rules that have antecedent items that are at least partially disjoint and conditionally dependent.

Another example embodiment may include an article of manufacture that includes a non-transitory, computer-readable medium having stored thereon program instructions that, upon execution by a computing system, cause the computing system to perform a method. The method includes obtaining a tabular data set with columns that respectively characterize items relating to behavior of components of a communication network. Records within the tabular data set represent events in the communication network. The method also includes constructing a frequent-pattern tree. Each respective node is associated with: (i) an item-name for representing an item in the tabular data set, (ii) a count of transactions from a root node of the frequent-pattern tree to the respective node, and (iii) node-links that refer to other nodes in the frequent-pattern tree that represent items having the same item-name. Further, the method includes traversing the frequent-pattern tree in a bottom-up fashion to identify, as part of frequent patterns, a set of nodes with counts greater than a predefined support threshold. Additionally, the method includes selecting a target item of the items. Yet further, the method includes generating, from the set of nodes, association-rules that are based on antecedent items associated with the target item. In addition, the method includes reducing the association-rules by (i) removing the association-rules in which the antecedent items thereof are a superset or subset of the antecedent items of a further association-rule, or (ii) combining two or more of the association-rules that have antecedent items that are at least partially disjoint and conditionally dependent.

Yet an additional example embodiment includes a computing system. The computing system includes one or more processors. The computing system also includes memory containing program instructions that, when executed by the one or more processors, cause the computing system to perform a method. The method includes obtaining a tabular data set with columns that respectively characterize items relating to behavior of components of a communication network. Records within the tabular data set represent events in the communication network. The method also includes constructing a frequent-pattern tree. Each respective node is associated with: (i) an item-name for representing an item in the tabular data set, (ii) a count of transactions from a root node of the frequent-pattern tree to the respective node, and (iii) node-links that refer to other nodes in the frequent-pattern tree that represent items having the same item-name. Additionally, the method includes traversing the frequent-pattern tree in a bottom-up fashion to identify, as part of frequent patterns, a set of nodes with counts greater than a predefined support threshold. Further, the method includes selecting a target item of the items. In addition, the method includes generating, from the set of nodes, association-rules that are based on antecedent items associated with the target item. Still further, the method includes reducing the association-rules by (i) removing the association-rules in which the antecedent items thereof are a superset or subset of the antecedent items of a further association-rule, or (ii) combining two or more of the association-rules that have antecedent items that are at least partially disjoint and conditionally dependent.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 2 depicts a table of association-rules, in accordance with example embodiments.

FIG. 3E depicts experimental results, in accordance with example embodiments.

FIG. 3F depicts experimental results, in accordance with example embodiments.

DETAILED DESCRIPTION

Figure 1A:
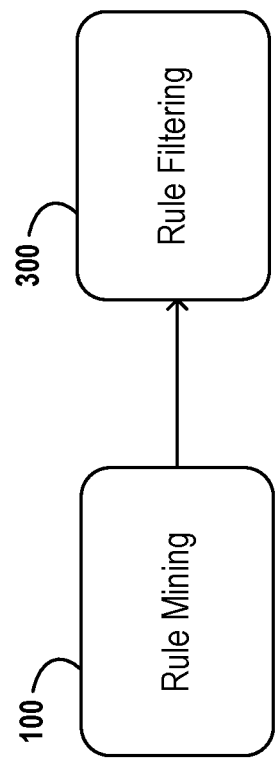
FIG. 1A depicts a fault analysis process, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

Historically, fault analysis has been used in information/network systems to analyze underlying issues with such systems. The more complex a system is, perhaps the more informative such analysis can be. For example, when systems become exceedingly complex, manual investigations by experts into the cause of errors may be time-consuming, computationally inefficient, or entirely unfeasible. Hence, using a fault analysis technique may prove superior.

Automated analysis techniques can be divided into two main types: deterministic techniques/models and statistical techniques/models. Deterministic techniques, while not prone to uncertainty, can include a number of handcrafted features and can also lack robustness. This can make it hard to generalize such techniques to new problems or new data. Statistical techniques, while more adaptable and more resilient to noise/inconsistencies in the data, may produce results that are difficult to interpret (e.g., due to their incorporation of machine learning techniques).

As such, the embodiments disclosed herein provide a hybrid technique that incorporates multivariable fault correction. Namely, the embodiments herein may involve an improved version of FP-Growth for association-rule mining that combines a modified association-rule learning, as well as a pruning and merging strategy to isolate the most consequential feature-outcome clusters for improved detection of possible network faults. Example embodiments may use a modified FPM technique to associate inputs with an outcome of interest (e.g., a blocked call status in a call detail record (CDR)). Specifically, the modified FPM process allows for fault localization associating clusters of inputs with negative outcomes in network data.

This is accomplished by searching for patterns of inputs (i.e., rules in associate rule learning terminology) with only one outcome value of interest, greatly reducing computation time relative to traditional FPM approaches that attempt to find patterns in a non-targeted way. This narrowing to a field of interest allows for a focusing of the result to a series of inputs (i.e., categorical properties, KPIs, etc.) ranked by their measured impact on a particular outcome of interest (e.g., a dropped calls) as done in a root cause analysis system. A pruning/merging process then allows for the combination of redundant rules by putting adjacent elements together when they do not increase the likelihood of the consequent outcome and removal of a longer rule when a subset of the rule may better explain the consequent outcome.

As a consequence, the embodiments herein are more accurate and scalable than previous fault detection and root cause diagnosis techniques. With these embodiments, computer networks, such as telecom networks and/or IP-based networks, can be operated more effectively and efficiently, as root cause of faults can be accurately identified and flagged for correction. While the techniques described herein offer a general approach that is broadly applicable in data-agnostic scenarios, the addition of automatic feature selection and rules post-processing analysis could increase the ability to integrate example embodiments into a cellular network automatic fault analysis system. Such a system could incorporate clear and actionable insights from established rules.

II. Rule Mining Phase

FIG. 1A depicts a fault analysis process 110, in accordance with example embodiments. The fault analysis process 110 may be performed by a computing system. For example, a computing system may include a non-transitory, computer-readable medium. The non-transitory, computer-readable medium may include instructions stored thereon that, when executed by the computing system (e.g., by a processor of the computing system) perform the fault analysis process 110. As illustrated, the fault analysis process 110 may include a rule mining phase 100 and a rule filtering phase 300, each of which is described in further detail below with reference to additional figures.

Figure 1B:
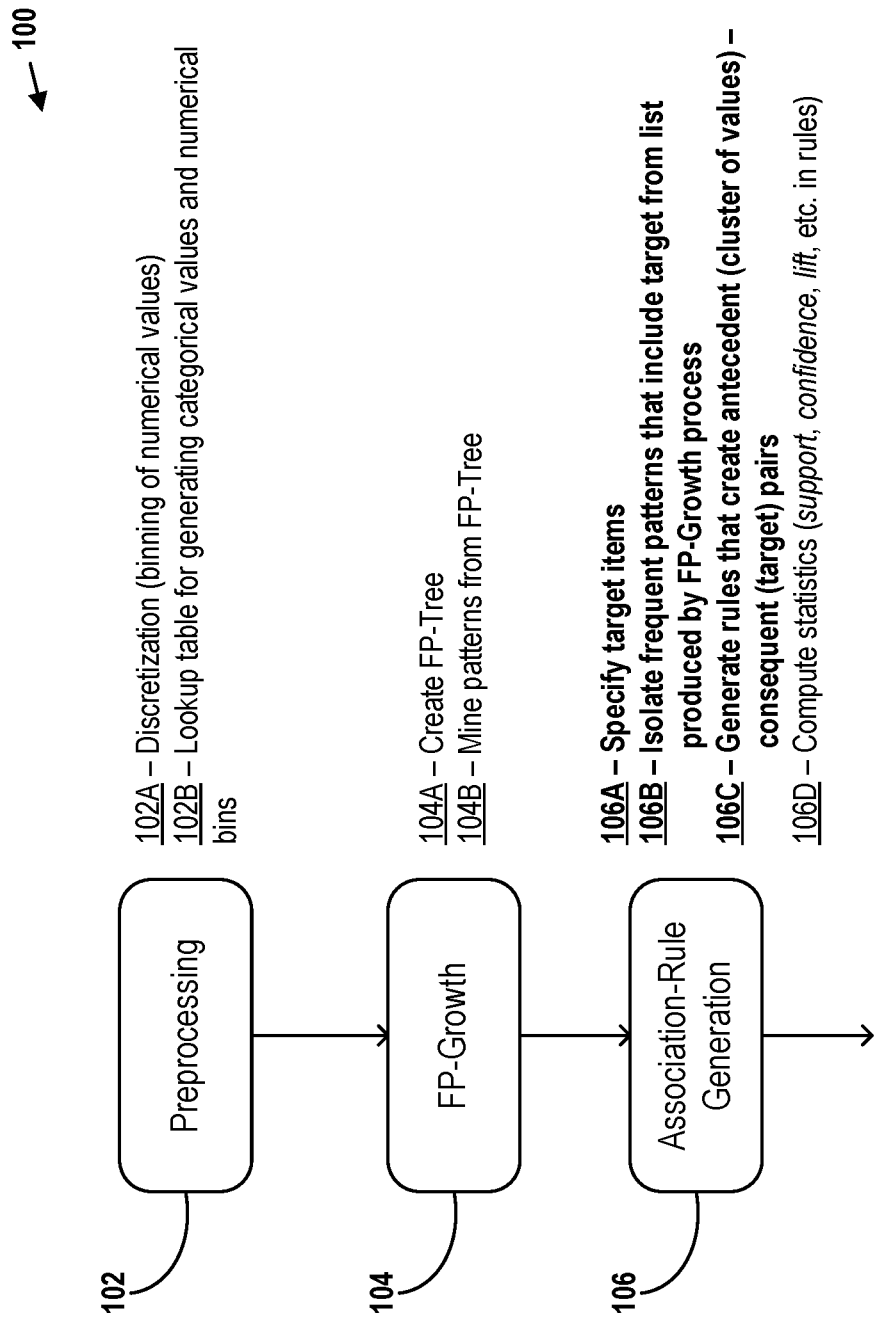
FIG. 1B depicts a rule mining phase of the fault analysis process, in accordance with example embodiments.

FIG. 1B depicts the rule mining phase 100 (e.g., the rule mining phase 100 of the fault analysis process 110 illustrated and described with reference to FIG. 1A). The rule mining phase 100 may include a preprocessing stage 102, an FP-Growth stage 104, and an association-rule generation stage 106. The preprocessing 102 and FP-Growth 104 stages may follow standardized methods while the association-rule generation stage 106 may be modified (indicated in bold) to narrow the generated rules to a field of interest (target items).

Preprocessing stage 102 may involve at least the following steps, as an example: discretization 102A and lookup table generation 102B. Given a tabular dataset (e.g., a tabular dataset where rows correspond to event records and columns correspond to event parameters or system states), the preprocessing stage 102 may include performing a discretization 102A (i.e., binning) of numerical values. There are multiple possible approaches for discretization. For example, discretization 102A may include fixed interval width discretization, fixed number of intervals discretization, or learned partitioning methods. Fixed interval width discretization (i.e., equal width discretization (EWD)) may involve dividing numerical values into a number of bins of equal interval length, where the number of bins is predefined. Fixed number of intervals discretization (i.e., equal frequency discretization (EFD)) may involve dividing numerical values into a number of bins, where each bin contains approximately the same predefined number of data points. Rounding to integers may be a specific type of EFD that is employed in some embodiments. Lastly, learned partitioning methods may involve using trained machine learning partitioning techniques to discretize the numerical values. Discretization 102A may allow for the inclusion of numerical data into the rule mining phase 100, where otherwise only discrete data (e.g., categories) may be included. As illustrated, the preprocessing stage 102 may also include lookup table generation 102B. Lookup table generation 102B may include creating and storing a lookup table (e.g., in a memory) that can be used to access the entries (e.g., the discretized entries) of the input tabular dataset. In some embodiments, the lookup table may store item-names, item frequency (e.g., item frequency across the entire tabular dataset), and/or a node-link structure (e.g., in the form of a linked list) that corresponds to a list of memory addresses that represent the address locations of each node in an FP-tree representation of the tabular dataset.

In some embodiments, the preprocessing stage 102 may also include a selection process. For example, an input tabular dataset may include hundreds or thousands of columns (or even more). In the case of large input tabular datasets, computation times may be overly onerous and/or the generated results may be significantly more difficult to interpret if the number of columns is not reduced. As such, in some embodiments a selection of only the most important (e.g., the most likely to result in faults or more easily interpreted) columns may be performed. Which columns are selected may be based on the recommendations of industry experts, for example. Lastly, in some embodiments, to further reduce computation time, the preprocessing stage 102 may also include an elimination of all records (e.g., all rows in a tabular dataset) that do not correspond to faults (e.g., because such rows would not provide information or would provide significantly less information regarding the causes of faults in the corresponding communication system).

The FP-Growth stage 104 may include performing a traditional FP-Growth process. The standard FP-Growth process can be used to mine frequent patterns. Further, the standard FP-Growth process may include: constructing a frequent pattern tree: FP-tree 104A and extracting frequent-patterns from the FP-tree via mining 104B. Processes 104A and 104B are shown and described further with reference to FIGS. 1C and 1D.

The FP-tree produced by process 104A may include a tree-like data structure, where each node (other than the root node, which may be labelled as "NULL") includes the following associated information: (i) an item-name for representing the item, (ii) a count that records the number of transactions from the root to the current node, and (iii) one or more node-links that point to other nodes in the same tree that represent items having the same item-name. The FP-tree may also include a corresponding lookup table that contains the actual items and pointers to the first node that contains the item-name. The lookup table may also include support values for the respective items. The support value may be a metric that represents the proportion of all transactions which include a given item or itemset. Further, an item may be considered a frequent pattern when the item's support value is greater than a predefined support threshold. The frequent patterns may then be generated by traversing FP-tree in a bottom-up fashion (e.g., according to pattern mining process 104B).

Figure 1C:
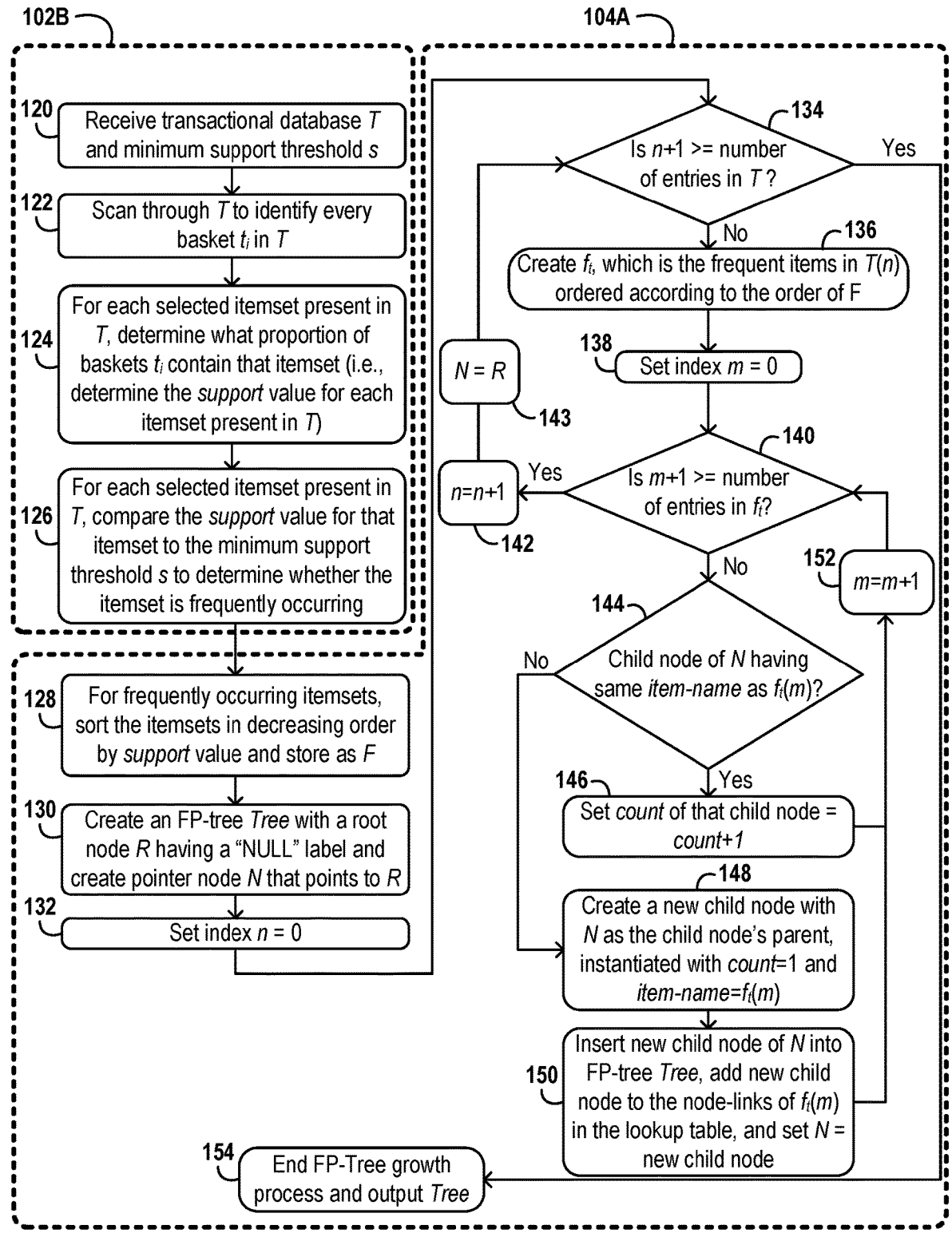
FIG. 1C depicts a method of generating a lookup table and a frequent pattern (FP) tree, in accordance with example embodiments.

FIG. 1C depicts portions of a lookup table generation process 102B and an FP-Tree growth process 104A as described above with respect to FIG. 1B, in accordance with example embodiments. As illustrated, a transactional database T and a minimum support threshold s may be provided as inputs, while Tree (an FP-Tree) may be produced as an output. Further, the steps of the lookup table generation process 102B and the FP-Tree growth process 104A may be performed by a computing system (e.g., by a processor executing instructions stored on a non-transitory, computer-readable medium).

At block 120, the lookup table generation process 102B may include receiving a transactional database T and a minimum support threshold s as inputs. After block 120, the lookup table generation process 102B may proceed to block 122.

At block 122, the lookup table generation process 102B may include scanning through the transactional database T to identify every basket $t_i$ that is present in the transactional database T After block 122, the lookup table generation process 102B may proceed to block 124.

At block 124, the lookup table generation process 102B may include, for each selected itemset present in the transactional database T, determining what proportion of baskets $t_i$ contain that itemset. In other words, at block 124, the lookup table generation process 102B may include determining the support value for each selected itemset present in the transactional database T. As described above, the preprocessing stage 102 may also include a selection process. For example, in some embodiments a selection of only the most important (e.g., the most likely to result in faults or more easily interpreted) columns may be performed. As such, in some embodiments, block 124 of the lookup table generation process 102B may only include determining the proportion of baskets $t_i$ that contain selected itemsets (e.g., itemsets not eliminated by the selection process). After block 124, the lookup table generation process 102B may proceed to block 126.

At block 126, the lookup table generation process 102B may include, for each itemset present in the transactional database T, comparing the support value determined for that itemset to the minimum support threshold s to determine whether the respective itemset can be considered to be frequently occurring based on the minimum support threshold s. For example, in some embodiments, if the support value for the respective itemset is greater than or equal to the minimum support threshold s, the respective itemset may be considered to be frequently occurring. Oppositely, if the support value for the respective itemset is less than the minimum support threshold s, the respective itemset may be considered to not be frequently occurring. In other embodiments, other techniques for making comparisons to the minimum support threshold s are also possible and are contemplated herein. Further, similar to block 124 and because the preprocessing stage 102 may also include a selection process described above, block 126 of the lookup table generation process 102B may only include comparing the support value of an itemset to the minimum support threshold s for selected itemsets (e.g., itemsets not eliminated by the selection process). After block 126, the lookup table generation process 102B may proceed to block 128. Further, in some embodiments, block 128 may correspond to a beginning of the FP-Tree growth process 104A (as illustrated in FIG. 1C).

At block 128, the FP-Tree growth process 104A may include, sorting the itemsets determined to be frequently occurring in block 126 in decreasing order by respective support value. This sorted list of itemsets may be stored as a set of frequent items F. After block 128, the FP-Tree growth process 104A may proceed to block 130.

At block 130, the FP-Tree growth process 104A may include creating an FP-Tree Tree with a root node R, which has the "NULL" label and also creating a pointer node N that points to node R. The pointer node N may be used to keep track of certain nodes of the tree during the FP-Tree growth process 104A, for example. After block 130, the FP-Tree growth process 104A may proceed to block 132.

At block 132, the FP-Tree growth process 104A may include creating an index value (e.g., index n) and instantiating that index value to zero (i.e., setting n=0). After block 132, the FP-Tree growth process 104A may proceed to block 134.

At block 134, the FP-Tree growth process 104A may include determining whether the value of index n plus one is greater than or equal to the number of entries in the transactional database T (i.e., determining whether n+1 is greater than or equal to the number of entries in T). This may effectively include determining whether the entire transactional database T has been cycled through already. If the value of index n plus one is greater than or equal to the number of entries in the transactional database T, the FP-Tree growth process 104A may proceed to block 154. If the value of index n plus one is not greater than or equal to the number of entries in the transactional database T, the FP-Tree growth process 104A may proceed to block 136.

At block 136, the FP-Tree growth process 104A may include creating a list of frequent items $f_t$, which represents the frequent items in the itemset represented by the entry having index n in the transactional database T when sorted according to the order of the list of frequent items F. After block 136, the FP-Tree growth process 104A may proceed to block 138.

At block 138, the FP-Tree growth process 104A may include creating an index value (e.g., index m) and instantiating that index value to zero (i.e., setting m=0). After block 138, the FP-Tree growth process 104A may proceed to block 140.

At block 140, the FP-Tree growth process 104A may include determining whether the value of index m plus one is greater than or equal to the number of entries in the list of frequent items $f_t$ (i.e., determining whether m+1 is greater than or equal to the number of entries in T). This may effectively include determining whether the entire list of frequent items $f_t$ has been cycled through already. If the value of index m plus one is greater than or equal to the number of entries in the list of frequent items $f_t$, the FP-Tree growth process 104A may proceed to block 142. If the value of index m plus one is not greater than or equal to the number of entries in the list of frequent items $f_t$, the FP-Tree growth process 104A may proceed to block 144.

At block 142, the FP-Tree growth process 104A may include incrementing index n by one (i.e., setting index n equal to n+1). After block 142, the FP-Tree growth process 104A may proceed to block 143.

At block 143, the FP-Tree growth process 104A may include setting pointer node N to point to root node R. After block 143, the FP-Tree growth process 104A may proceed to block 134.

At block 144, the FP-Tree growth process 104A may include determining whether a child node of pointer node N has the same item-name as the item in the list of frequent items $f_t$ located at index m. In other words, at block 144, the FP-Tree growth process 104A may include determining whether any child node of pointer node N has the same item-name as $f_t(m)$. If there is a child node of pointer node N that has the same item-name as $f_t(m)$, the FP-Tree growth process 104A may proceed to block 146. If there is not a child node of pointer node N that has the same item-name as $f_t(m)$, the FP-Tree growth process 104A may proceed to block 148.

At block 146, the FP-Tree growth process 104A may include incrementing the count value associated with the child node that has the same item-name as $f_t(m)$. In other words, at block 146, the FP-Tree growth process 104A may include setting the count value associated with the child node that has the same item-name as $f_t(m)$ equal to that count value plus one. After block 146, the FP-Tree growth process 104A may proceed to block 152.

At block 148, the FP-Tree growth process 104A may include creating a new child node of pointer node N and instantiating that created child node with: pointer node N as a parent node, a count value of one, and an item-name value equal to the item-name value of the list of frequent items $f_t$ at index m (i.e., $f_t(m)$). After block 148, the FP-Tree growth process 104A may proceed to block 150.

At block 150, the FP-Tree growth process 104A may include inserting the child node created in block 148 into the FP-Tree Tree, adding the child node created in block 148 to the node-links of the lookup table that correspond to the item-name value of the list of frequent items $f_t$ at index m (i.e., $f_t(m)$), and setting the pointer node N to point at the newly inserted child node. After block 150, the FP-Tree growth process 104A may proceed to block 152.

At block 152, the FP-Tree growth process 104A may include incrementing index m by one (i.e., setting index m equal to m+1). After block 152, the FP-Tree growth process 104A may proceed to block 140.

At block 154, the FP-Tree growth process 104A may include ending the FP-Tree growth process 104A and outputting the FP-Tree Tree.

Figure 1D:
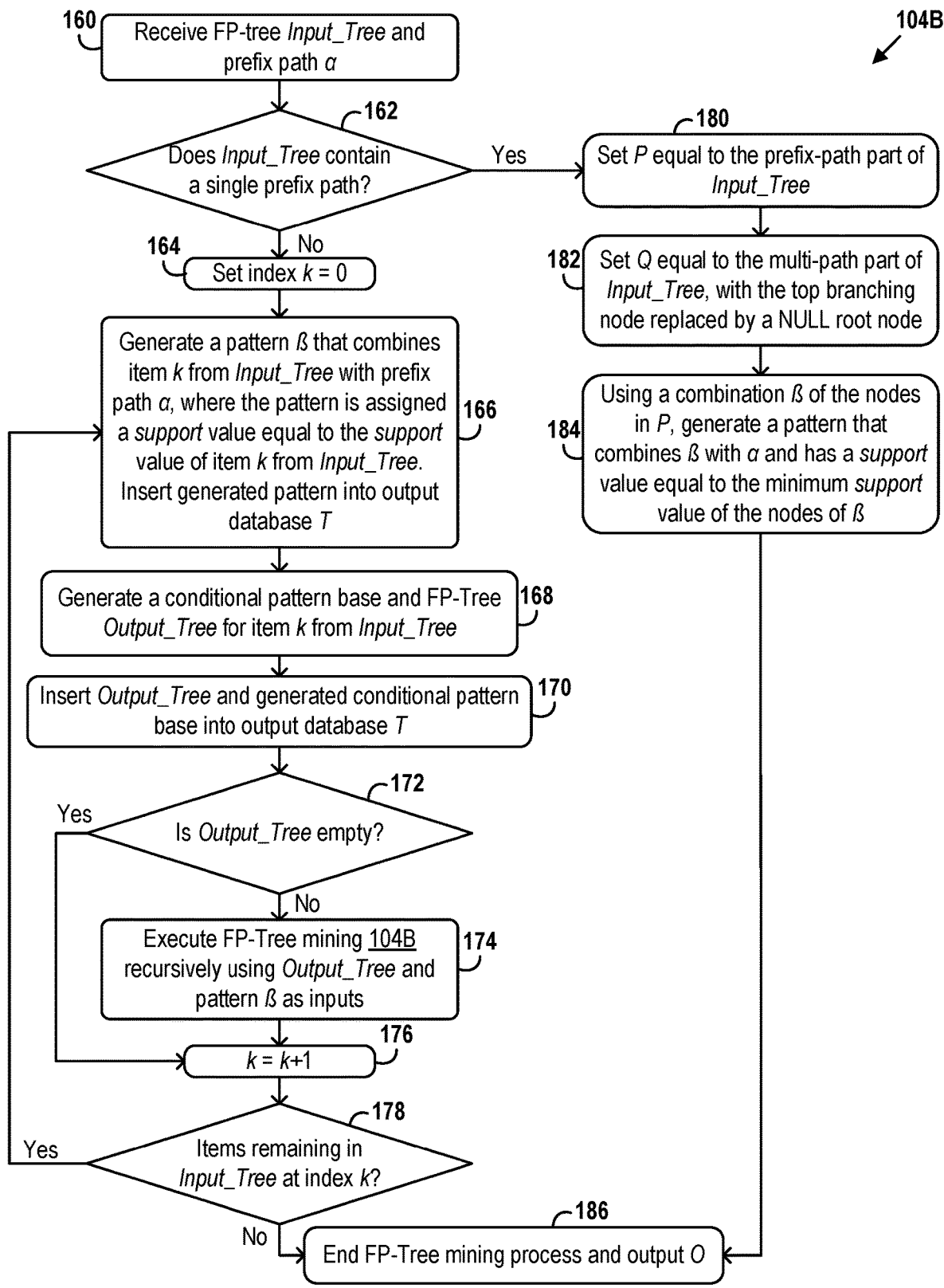
FIG. 1D depicts a method of mining an FP-tree for patterns, in accordance with example embodiments.

FIG. 1D depicts an FP-Tree mining process 104B as described above with respect to FIG. 1B, in accordance with example embodiments. As illustrated, the FP-Tree mining process 104B may take an FP-Tree Input_Tree (e.g., output from the FP-Tree growth process 104A shown and described with respect to FIG. 1C) and a prefix path α as inputs and provide T (a database containing the set of frequent patterns) as an output. As also illustrated, the FP-Tree mining process 104B may represent a recursive process (i.e., a process having portions which call itself). Further, the steps of the FP-Tree mining process 104B may be performed by a computing system (e.g., by a processor executing instructions stored on a non-transitory, computer-readable medium).

At block 160, the FP-Tree mining process 104B may include receiving an FP-Tree Input_Tree and a prefix path α as inputs. A prefix path may include a series of connected nodes along a single path (e.g., including multiple levels of the tree) that precede further nodes in the tree. For example, a string of three nodes (e.g., $a_1 \rightarrow b_1 \rightarrow c_1$) may represent a prefix path that spans three tree levels. Further, the series of three nodes may then continue to branch into further nodes (e.g., node $c_1$ may branch off to nodes $d_1$, $d_2$, and $d_3$, which may each be in the same level of the tree). In some embodiments, the FP-Tree Input_Tree may have been generated according to the FP-Tree growth process 104A of FIG. 1C. After block 160, the FP-Tree mining process 104B may proceed to block 162.

At block 162, the FP-Tree mining process 104B may include determining whether the FP-Tree Input_Tree includes only a single prefix path. If the FP-Tree Input_Tree does only include a single prefix path, the FP-Tree mining process 104B may proceed to block 180. If the FP-Tree Input_Tree does not include only a single prefix path, the FP-Tree mining process 104B may proceed to block 164.

At block 164, the FP-Tree mining process 104B may include creating an index value (e.g., index k) and instantiating that index value to zero (i.e., setting k=0). After block 164, the FP-Tree mining process 104B may proceed to block 166.

At block 166, the FP-Tree mining process 104B may include generating a pattern β that combines item k from Input_Tree with prefix path α. This generated pattern β may then be assigned a support value equal to the support value of item k from Input_Tree and the generated pattern β is inserted into the output database T. After block 166, the FP-Tree mining process 104B may proceed to block 168.

At block 168, the FP-Tree mining process 104B may include generating a conditional pattern base and an FP-Tree Output_Tree for item k from Input_Tree. A conditional pattern base may represent a sub-database or truncated database that corresponds to the entries related to a particular prefix paths. After block 168, the FP-Tree mining process 104B may proceed to block 170.

At block 170, the FP-Tree mining process 104B may include inserting the conditional pattern base and FP-Tree Output_Tree generated at block 168 into the output database T. After block 170, the FP-Tree mining process 104B may proceed to block 172.

At block 172, the FP-Tree mining process 104B may include determining whether FP-Tree Output_Tree is empty. If FP-Tree Output_Tree is not empty, the FP-Tree mining process 104B may proceed to block 174. If FP-Tree Output_Tree is empty, the FP-Tree mining process 104B may proceed to block 176.

At block 174, the FP-Tree mining process 104B may include executing another instance of the FP-Tree mining process 104B recursively using FP-Tree Output_Tree and pattern β as inputs to the FP-Tree mining process 104B. After block 174, the FP-Tree mining process 104B may proceed to block 176.

At block 176, the FP-Tree mining process 104B may include incrementing index k by one (i.e., setting index k equal to k+1). After block 176, the FP-Tree mining process 104B may proceed to block 178.

At block 178, the FP-Tree mining process 104B may include determining whether there are any items remaining in Input_Tree at index k. If there are items remaining in Input_Tree at index k, the FP-Tree mining process 104B may proceed to block 166. If there are not any items remaining in Input_Tree at index k, the FP-Tree mining process 104B may proceed to block 186.

At block 180, the FP-Tree mining process 104B may include setting path P equal to the prefix-path part of Input_Tree. After block 180, the FP-Tree mining process 104B may proceed to block 182.

At block 182, the FP-Tree mining process 104B may include setting path Q equal to the multi-path part of Input_Tree, with the top branching node of the multi-path part replaced by a root node with a "NULL" label. After block 182, the FP-Tree mining process 104B may proceed to block 184.

At block 184, the FP-Tree mining process 104B may include using a combination β of the nodes in path P to generate a pattern that combines β with α and has a support value equal to the minimum support value of the nodes of β. After block 184, the FP-Tree mining process 104B may proceed to block 186.

At block 186, the FP-Tree mining process 104B may conclude and output the database O containing the set of frequent patterns.

The association-rule generation stage 106 illustrated in FIG. 1B may be used to determine association-rules from frequent patterns. The association-rules may associate patterns that occur frequently together. The embodiments herein may reduce the number of generated association-rules by isolating the frequent-patterns that include a target-item (e.g., call status) from the list produced by the FP-Growth process 104. The target-item may be identified by various methods (e.g., based on manual data entry from a user). The association-rules may be generated by creating pairs of one or more antecedents (cluster of one or more items) associated with a consequent. The consequents can be specific instances (values) of the selected target-item.

Figure 2:
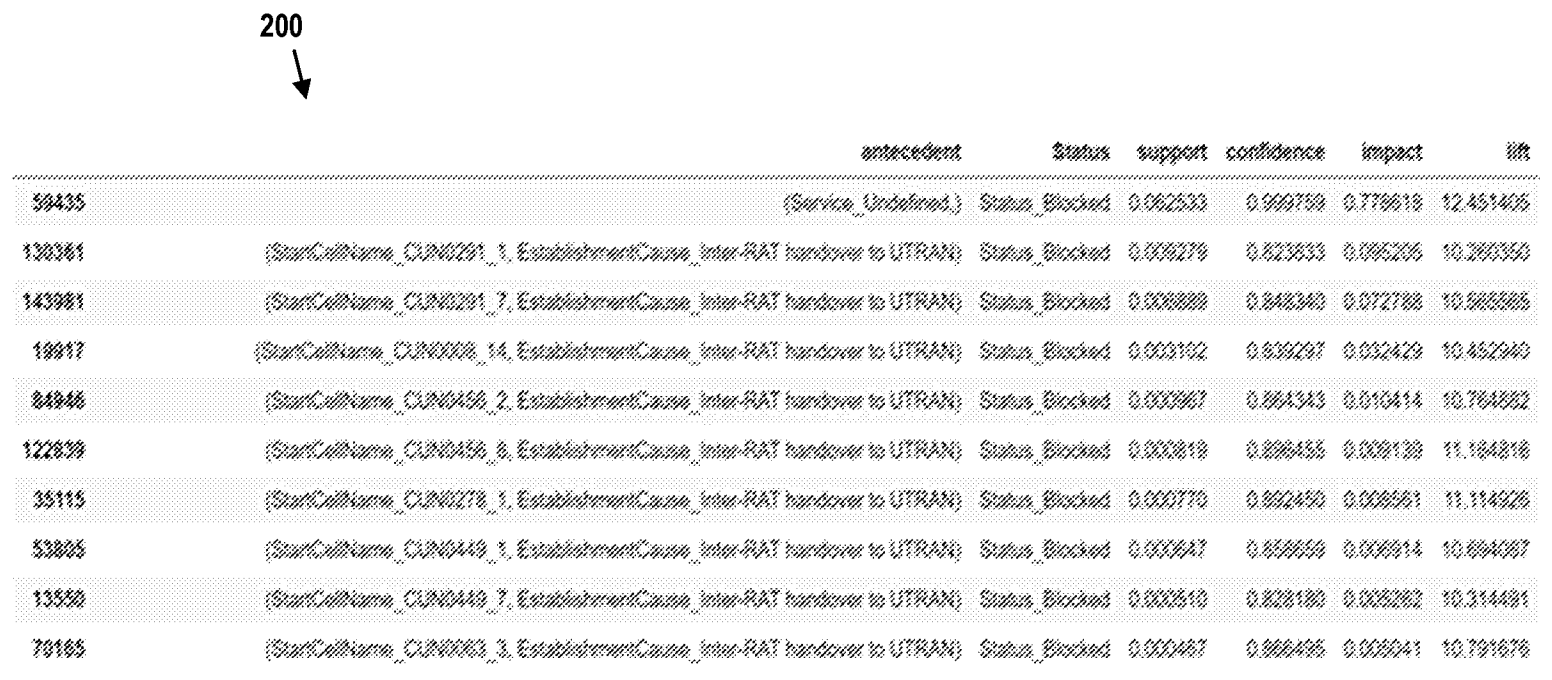

As an example, FIG. 2 depicts table 200, which contains a set of association-rules. In this example, the target-item is the "Status" and the specific instance is "Status_Blocked", representing when a call was blocked from being established. The consequent in each of these example association-rules would therefore be: "Status=Status_Blocked". The antecedent is a single instance for association-rule 59435 ("Service=Undefined") and a cluster of instances for other association-rules (e.g., for association-rules 130361, 143981, 19917, etc.). It is understood that many other target-items and specific instances associated with those target-items are also possible and are contemplated herein (e.g., both those within telecommunication networks and outside of telecommunications). For example, other instances of "Status" may include "Dropped" (e.g., representing a dropped call), "Non-Progressed" (e.g., representing a non-progressed call), etc.

Four measures of significance can be used to evaluate the association-rules: (i) support indicates how often the current association-rule occurs in the dataset; (ii) confidence gives the prediction of a consequent given the antecedent's correctness; (iii) lift measures the level of independence of an antecedent and a consequent; and (iv) impact measures the support and confidence for consequent and antecedent pairs over the proportion of affected examples with that pairing (e.g., proportion of blocked calls). Equations for these measures are given below, where X and Y represent a rule antecedent and a rule consequent, respectively, and P(X), P(Y), and P(X,Y) represent the probability of X within the dataset, the probability of Y within the dataset, and the probability of both X and Y together within the dataset, respectively:

$$\text{Support}(X) = \frac{\text{\# of records containing } X}{\text{total \# of records}}$$

$$\text{Confidence}(X \to Y) =$$

$$\frac{\text{Support}(X \cup Y)}{\text{Support}(X)} = \frac{\text{\# of records containing } X \cup Y}{\text{\# of records containing } X} = \frac{P(X, Y)}{P(X)}$$

$$\text{Lift/Interest}(X \to Y) = \frac{\text{Support}(X \cup Y)}{\text{Support}(X) \times \text{Support}(Y)} = \frac{P(X, Y)}{P(X)P(Y)}$$

$$\text{Impact}(X \to Y) = \frac{\text{Support}(X) \times \text{Confidence}(X \to Y)}{\text{\# of records with target\_value/total \# of records}}$$

To continue with the previous example, for association-rule 59435, the support value is 0.062533, which means that "Service=Undefined" is present in 6.25% of the records. The confidence value is 0.999759, which means that when "Service=Undefined", 99.9759% of the records are also "Status=Blocked". The lift value is 12.451405, which means "Service=Undefined" represents a considerable antecedent of "Status=Blocked". Anything above a value of 1 would be considered likely dependent.

Selecting a target_item does not change the way the measures of significance are calculated. Instead, the measures are an objective evaluation of any rule determined by the algorithm and these measures can be used to qualify that pruning and merging steps (e.g., the pruning and merging illustrated and described with reference to FIGS. 3A-3C below) will not remove antecedent-consequent pairs that added value. In some embodiments, association-rules may be ranked by their measured impact to focus on negative outcomes in network data for a selected target_item.

III. Rule Filtering

Figure 3A:
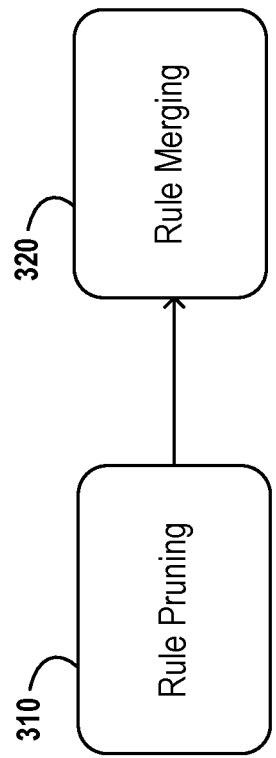
FIG. 3A depicts a rule filtering process, in accordance with example embodiments.

FIG. 3A describes a rule filtering process 300 (e.g., the rule filtering process 300 illustrated in FIG. 1A). The rule filtering process 300 may be performed by a computing system (e.g., by a processor of the computing system executing instructions stored within a non-transitory, computer-readable medium). As illustrated, the rule filtering process 300 may include a rule pruning process 310, which is followed by a rule merging process 320. The rule filtering process 300 may be used to isolate the most pertinent patterns among a set of mined association-rules. In some embodiments, only the association-rules that meet pre-defined criteria may be considered by the rule filtering process 300 (e.g., rather than keeping/analyzing every mined association-rule).

Figure 3B:
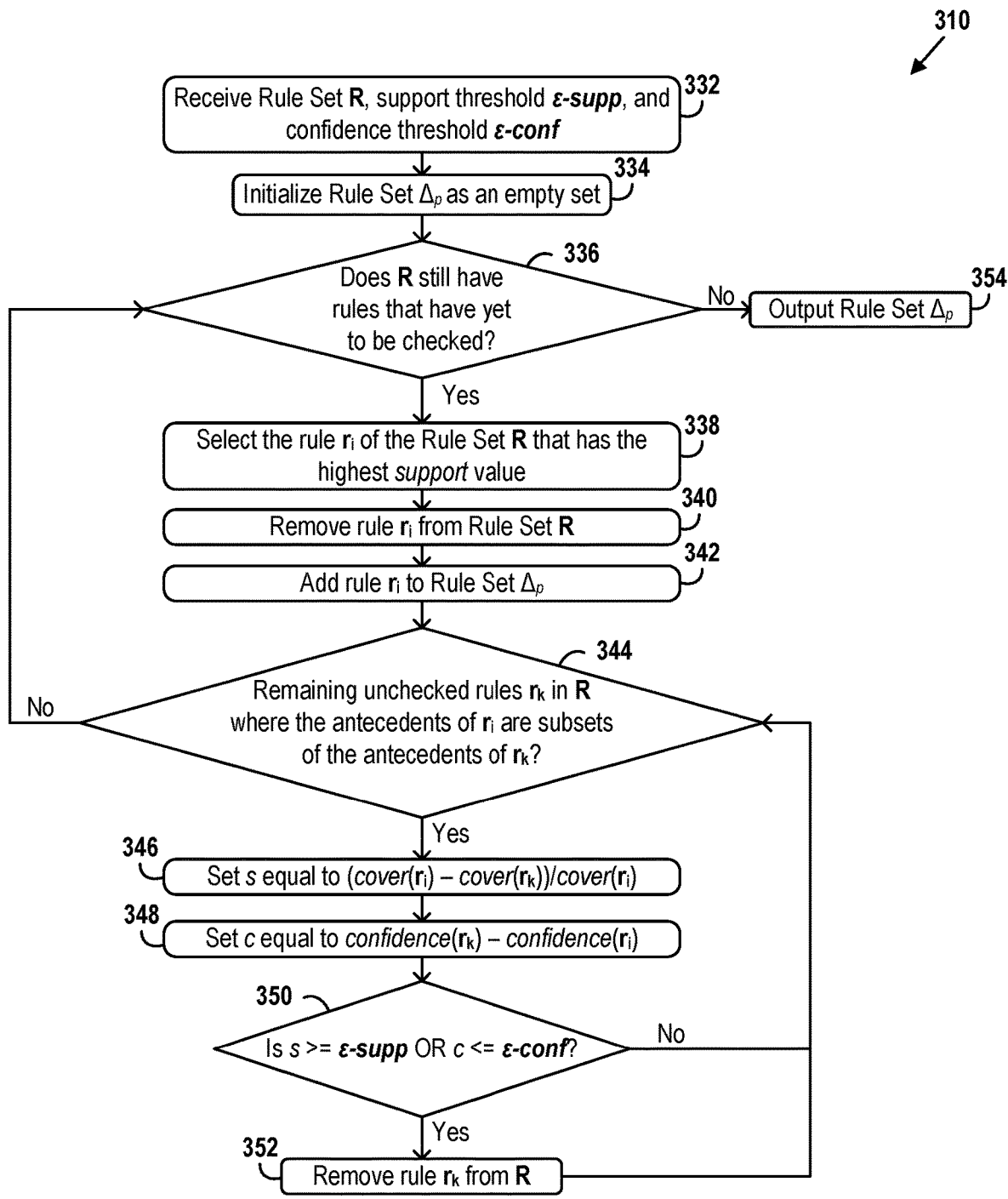
FIG. 3B depicts a rule pruning phase of the rule filtering process, in accordance with example embodiments.
Figure 3C:
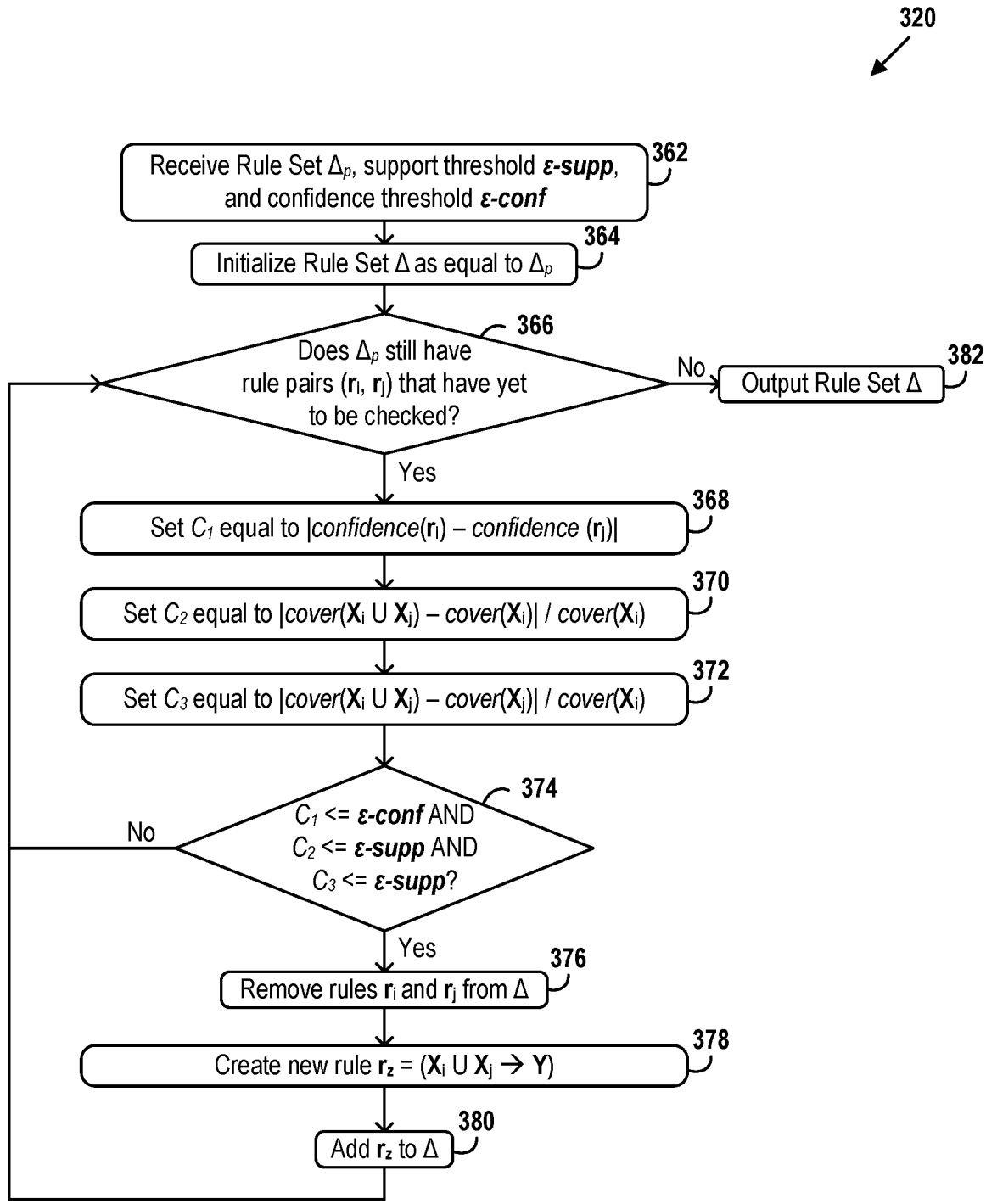
FIG. 3C depicts a rule merging phase of the rule filtering process, in accordance with example embodiments.

As shown and described further with reference to FIGS. 3B and 3C, the rule filtering process 300 may perform multiple functions. For example, the rule filtering process 300 may include combining rules that have numerical items in their antecedents (i.e., items that have been discretized into bins/discrete groupings) that can be combined when they have the same or similar confidence values. Thus, a larger range for the discretized item may be produced to have a more meaningful range and reduce the number of antecedents. For example, given two bins for an item (−4.75, −4.5] and (−5.025, −4.75], if these bins are present in two rules where the antecedents match on all other items and the confidence value is sufficiently similar (e.g., within a bounded range), the bins can be merged to produce a single rule with a merged bin (−5.025, −4.5].

In some embodiments of the rule filtering process 300, the rule pruning process 310 may produce a cover set that is then used by the rule merging process 320. While cover sets are a concept in mathematics, example embodiments described herein apply cover set filtering to merge and combine the results of a FP-Growth tree. This rule filtering process 300 may help to narrow rules to only the most relevant (i.e., non-redundant) antecedent rules, removing a lot of the noise that can be produced by typical applications of pattern mining and increasing the utility for targeting applications in network data.

An example rule pruning (e.g., similar to as may be performed as part of the rule pruning process 310) may proceed in the following way. Suppose that there are two rules: (i) a+b→consequent, and (ii) a+b+c→consequent. Since a+b+c is a superset of a+b (as it contains all the same items and more), if both rules 1 and 2 have the same or similar confidence values, then the item c does not add sufficient value, so it may be pruned. After applying this same pruning to all rules, a cover set of rules remains. Alternatively, the rule with the superset could be removed.

An example rule merging (e.g., similar to as may be performed as part of the rule merging process 320) may proceed in the following way. Suppose that there are two rules: (i) a+b→consequent, and (ii) a+c→consequent. If b and c are items from different columns (e.g., of a database), and rules 1 and 2 are conditionally dependent as measured by comparing their support values, then the rules may be merged to form a single rule a+b+c→consequent.

An example rule pruning process 310 and example rule merging process 320 will now be described in further detail with reference to FIGS. 3B and 3C, respectively.

FIG. 3B depicts a rule pruning process 310 as described above with respect to FIG. 3A, in accordance with example embodiments. The rule pruning process 310 may receive a rule set R (e.g., a rule set mined according to FP-Growth, such as by the rule mining phase 100 shown and described with reference to FIGS. 1B-1D), a support threshold ε-supp, and a confidence threshold ε-conf as inputs. Further, the rule pruning process 310 may provide a pruned rule set $\Delta_p$ as an output. Additionally, the steps of the rule pruning process 310 may be performed by a computing system (e.g., by a processor executing instructions stored on a non-transitory, computer-readable medium).

At block 332, the rule pruning process 310 may include receiving the rule set R (e.g., a rule set mined according to FP-Growth), the support threshold ε-supp, and the confidence threshold ε-conf as inputs. The support threshold ε-supp, and the confidence threshold ε-conf may be referred to as hyperparameters, which are used to tune the rule pruning process 310. The support threshold ε-supp, and the confidence threshold ε-conf may be defined by a user (e.g., an expert in the technical field associated with the fault detection). In some embodiments, the support threshold ε-supp, and the confidence threshold ε-conf may be defined empirically. Alternatively, in some embodiments, support threshold ε-supp, and the confidence threshold ε-conf may be defined theoretically (e.g., based on characteristics of data within the rule set R). Such thresholds may be chosen based on desired computation speed, desired number of output results, and/or desired interpretability of output results. For example, a lower support threshold ε-supp may result in additional spurious rules being formed (e.g., such rules only existing by coincidence), as a higher ε-supp may increase the removal of parent rules. Additionally, a higher support threshold ε-supp may result in improved runtime performance. Still further, the confidence threshold ε-conf may affect the number of results and, therefore, may be tuned to generate a relatively low number of results that are easily interpretable or generate a larger number of results that have lower interpretability. For example, a higher ε-conf may correspond to keeping the parent rules with high confidence and replacing the child rules in the final result. After block 332, the rule pruning process 310 may proceed to block 334.

At block 334, the rule pruning process 310 may include creating a new rule set $\Delta_p$ and initializing the rule set $\Delta_p$ as equal to the empty set. After block 334, the rule pruning process 310 may proceed to block 336.

At block 336, the rule pruning process 310 may include determining whether the rule set R has any remaining rules that have yet to be analyzed (e.g., by blocks 338, 340, 342, 344, 346, 348, 350, and 352 of the rule pruning process 310). If the rule set R does have rules that have not yet been analyzed, the rule pruning process 310 may proceed to block 338. If the rule set R does not have any rules that have yet to be analyzed, the rule pruning process 310 may proceed to block 354.

At block 338, the rule pruning process 310 may include selecting the rule $r_i$ in the rule set R with the highest support value. After block 338, the rule pruning process 310 may proceed to block 340.

At block 340, the rule pruning process 310 may include removing rule $r_i$ from the rule set R. After block 340, the rule pruning process 310 may proceed to block 342.

At block 342, the rule pruning process 310 may include adding rule $r_i$ to the rule set $\Delta_p$. After block 342, the rule pruning process 310 may proceed to block 344.

At block 344, the rule pruning process 310 may include determining whether there are any rules $r_k$ in the rule set R: (i) where the antecedents of $r_i$ are subsets of the antecedents of $r_k$ and (ii) that have yet to be analyzed (e.g., by blocks 346, 348, 350, and 352 of the rule pruning process 310). If there are any such rules $r_k$, the rule pruning process 310 may proceed to block 346. If there are not any such rules $r_k$, the rule pruning process 310 may proceed to block 336.

At block 346, the rule pruning process 310 may include setting a values equal to $(\text{cover}(r_i) - \text{cover}(r_k))/\text{cover}(r_i)$. The cover of a given rule r may be defined in the following way: $\text{cover}(r) = \text{cover}(X \rightarrow Y) = \text{support}(X)$. After block 346, the rule pruning process 310 may proceed to block 348.

At block 348, the rule pruning process 310 may include setting a value c equal to $\text{confidence}(r_k) - \text{confidence}(r_i)$. After block 348, the rule pruning process 310 may proceed to block 350.

At block 350, the rule pruning process 310 may include determining whether s (as determined in block 346) is greater than or equal to ε-supp or if c (as determined in block 348) is less than or equal to ε-conf. If s is greater than or equal to ε-supp or c is less than or equal to ε-conf, the rule pruning process 310 may proceed to block 352. If s is not greater than or equal to ε-supp and c is not less than or equal to ε-conf, the rule pruning process 310 may proceed to block 344.

At block 352, the rule pruning process 310 may include removing rule $r_k$ from the rule set R. After block 352, the rule pruning process 310 may proceed to block 344.

Blocks 336, 338, 340, 342, 344, 346, 358, 350, and 352 of the rule pruning process 310 described above may essentially include taking a set of items that are considered sufficient for explaining a fault and then reducing the total number of rules to that set of items by eliminating those rules that are redundant with respect to the same group of possible root cause items as one another.

At block 354, the rule pruning process 310 may include outputting the rule set $\Delta_p$. The rule set $\Delta_p$ may be referred to herein as a cover rule set. In some embodiments, upon completion of block 354, the rule pruning process 310 may cease.

FIG. 3C depicts a rule merging process 320 as described above with respect to FIG. 3A, in accordance with example embodiments. The rule merging process 320 may receive a rule set $\Delta_p$ (e.g., a rule set pruned according to the rule pruning process 310), a support threshold ε-supp, and a confidence threshold ε-conf as inputs. Further, the rule merging process 320 may provide a merged rule set Δ as an output. Additionally, the steps of the rule merging process 320 may be performed by a computing system (e.g., by a processor executing instructions stored on a non-transitory, computer-readable medium).

At block 362, the rule merging process 320 may include receiving the rule set $\Delta_p$ (e.g., the cover set produced by the rule pruning process 310), the support threshold ε-supp, and the confidence threshold ε-conf as inputs. After block 362, the rule merging process 320 may proceed to block 364.

At block 364, the rule merging process 320 may include creating a new rule set Δ and initializing the rule set Δ as equal to the received rule set $\Delta_p$. After block 364, the rule merging process 320 may proceed to block 366.

At block 366, the rule merging process 320 may include determining whether the rule set $\Delta_p$ has any pairs of rules ($r_i$, $r_j$) that have yet to be analyzed. If the rule set $\Delta_p$ does have a pair of rules ($r_i$, $r_j$) yet to be analyzed, the rule merging process 320 may proceed to block 368. If the rule set $\Delta_p$ does not have any pairs of rules ($r_i$, $r_j$) yet to be analyzed, the rule merging process 320 may proceed to block 382.

At block 368, the rule merging process 320 may include setting a value $C_1$ equal to |confidence($r_i$)−confidence($r_j$)|. After block 368, the rule merging process 320 may proceed to block 370.

At block 370, the rule merging process 320 may include setting a value $C_2$ equal to |cover($X_i \cup X_j$)−cover($X_i$)|/cover($X_i$), where $X_i$ and $X_j$ represent the antecedents of rules $r_i$ and $r_j$ respectively. After block 370, the rule merging process 320 may proceed to block 372.

At block 372, the rule merging process 320 may include setting a value $C_3$ equal to |cover($X_i \cup X_j$)−cover($X_j$)|/cover($X_j$), where $X_i$ and $X_j$ represent the antecedents of rules $r_i$ and $r_j$, respectively. After block 372, the rule merging process 320 may proceed to block 374.

At block 374, the rule merging process 320 may include determining whether $C_1$ is less than or equal to ε-conf, $C_2$ is less than or equal to ε-supp; and $C_3$ is less than or equal to ε-supp. If $C_1$ is less than or equal to ε-conf $C_2$ is less than or equal to ε-supp; and $C_3$ is less than or equal to ε-supp, the rule merging process 320 may proceed to block 376. If $C_1$ is not less than or equal to ε-conf $C_2$ is not less than or equal to ε-supp; or $C_3$ is not less than or equal to ε-supp, the rule merging process 320 may proceed to block 366.

At block 376, the rule merging process 320 may include removing rules $r_i$ and $r_j$ from the rule set Δ. After block 376, the rule merging process 320 may proceed to block 378.

At block 378, the rule merging process 320 may include creating a new rule $r_z$. The new rule $r_z$ may combine the antecedents of rules $r_i$ and $r_j$ with a single consequent. For example, the new rule $r_z$ may be equal to ($X_i \cup X_j \rightarrow Y$). After block 378, the rule merging process 320 may proceed to block 380.

At block 380, the rule merging process 320 may include adding the new rule $r_z$ to the rule set Δ. After block 380, the rule merging process 320 may proceed to block 366.

Blocks 366, 368, 370, 372, 374, 376, 378, and 380 of the rule merging process 320 described above may essentially include determining whether there exists a pair of rules that have heavily dependent antecedents with coinciding items from their antecedents. If there does exist such a pair of rules, the antecedents can be merged to form one larger antecedent. This can reduce the overall number of rules and also generate a larger antecedent which can be beneficial when investigating underlying causes of problems.

At block 382, the rule merging process 320 may include outputting the rule set Δ. In some embodiments, upon completion of block 382, the rule merging process 320 may cease.

The embodiments described herein can result in multiple improvements to fault detection systems (e.g., in terms of computation time, number of results, interpretability of results, etc.). In order to verify the techniques described herein and demonstrate performance enhancement, multiple comparisons to alternative techniques have been performed. Such comparisons are shown and described with reference to FIGS. 3D-3H.

Figure 3D:
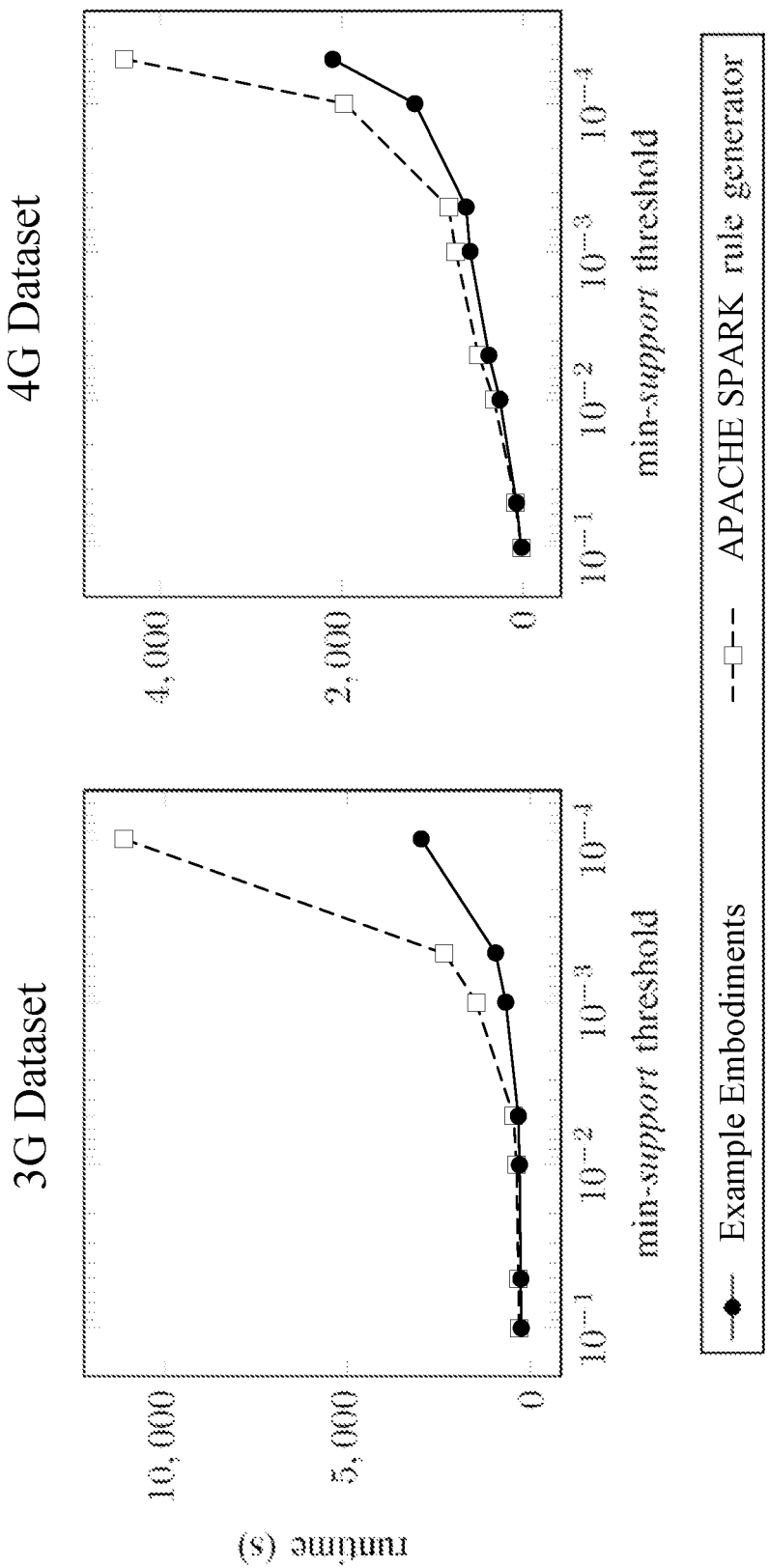
FIG. 3D depicts experimental results, in accordance with example embodiments.

For example, experiments were conducted to compare the association-rule generation strategies described herein (e.g., the processes of FIGS. 1A-1D and 3A-3C described above) with the association-rule generation strategies provided by APACHE SPARK (both of which may use an underlying FP-Growth process to at least some degree). FIG. 3D illustrates the results of one such experiment. In FIG. 3D, runtime comparisons between the APACHE SPARK method and example embodiments are demonstrated (shown in a linear-log scale). The runtimes illustrated in the plots of FIG. 3D were measured using 8 workers, 1 executor per worker, 4 GB of random-access memory (RAM) per worker, and one central processing unit (CPU) core per worker. In the experiments of FIG. 3D, both associate-rule generation methodologies were executed 7 times and the average runtime was reported. As illustrated in FIG. 3D, both example embodiments and the APACHE SPARK rule generation were tested on two datasets (a third-generation (3G) cellular network dataset and a fourth-generation (4G) cellular network dataset), with varying minimum support threshold values for each. Both of the datasets were extracted from cellular network data over the course of 24 hours. The 3G cellular network dataset contained approximately 16 million entries, with 28 columns for each entry (16 of which were selected for fault analysis). Further, the most prevalent failure categories in the 3G cellular network dataset were "Status=Blocked", followed by "Status=Non-Progress", followed by "Status=Dropped". The 4G cellular network dataset contained approximately 1.6 million entries with 23 selected columns (15 of which were numerical). Unlike the 3G cellular network dataset, the most prevalent failure categories in the 4G cellular network dataset were "Status=Undefined", followed by "Status=Dropped", followed by "Status=Blocked", followed by "Status=Non-Progress".

As illustrated in FIG. 3D, for both the 3G dataset and the 4G dataset, example embodiments exhibited lower runtimes across the full spectrums of minimum support thresholds. For example, for a minimum support threshold of $10^{-4}$, example embodiments had runtimes of about 3000 seconds and 2100 seconds for the 3G dataset and the 4G dataset, respectively. However, for the same minimum support threshold of $10^{-4}$, the APACHE SPARK rule generator had runtimes of about 11,000 seconds and 4,300 seconds for the 3G dataset and the 4G dataset, respectively. As demonstrated, the embodiments disclosed herein result in a considerable speedup when compared to the alternative APACHE SPARK rule generation.

In addition to comparing runtime to alternative techniques, experiments were conducted to compare the interpretability of the rules generated by example embodiments described herein. Rule sets generated by the rule filtering techniques described herein (e.g., the rule filtering process 300 shown and described with reference to FIGS. 3A-3C) were compared to rule sets generated by FB filtering (the filtering method proposed in "Fast Dimensional Analysis for Root Cause Investigation in a Large-Scale Service Environment," F. Lin et al., *Proceedings of the ACM on Measurement and Analysis of Computing Systems*, vol. 4, no. 2, pp. 1-23, June 2020), HC filtering (the filtering method proposed in "Hierarchical Clustering for thematic browsing and summarization of large sets of Association Rules," A. Jorge, *SIAM International Conference on Data Mining*, Lake Buena Vista, Florida, USA: SIAM, April 2004, pp. 178-187), and FAR filtering (the filtering method proposed in "A methodology for filtering associate rules," A. Faria, *Revista de Ciencias da Computação*, vol. II, no. 2, pp. 14-25, January 2007). The results of these experiments are presented in FIGS. 3E-3H. Note that, to generate these results: for the FB filter, the support and confidence filter thresholds were each set to 1.01 and the number of required rules for example embodiments described herein was set to 30.

In general, quantitative analysis of the quality of filtering methods is somewhat challenging to describe. However, there are generally multiple desired features when it comes to a set of filtered rules: (i) The size of the set: the smaller the set, the better for human tracking; (ii) coverage of the set: the filtered set should be able to provide a high fraction, ideally of all, potential root cause items; (iii) quality of the measurements: the higher support and confidence of each individual rule in the set, the better it helps to perform the fault analysis; and (iv) the correlation between rules in the set: the rules should have no high similarity between them. In other words, each rule should explain a different perspective (e.g., root cause) of the fault analysis.

In FIG. 3E, the results of the rule filtering techniques described herein (labeled as "CS filtering" to represent "cover set filtering" in FIG. 3E) as applied to the 3G dataset described above are compared to unfiltered results and results generated by FB filtering, HC filtering, and FAR filtering. In addition to the results generated by the rule filtering techniques described herein, the results for only the top 10 rules (according to impact value) of example embodiments described herein (labeled as "CS filtering @ top10" in FIG. 3E) are also shown for comparison. Note that, for the 3G dataset, the values for the HC filtering are labeled with "N/A" as no rules resulted from the HC filtering. As illustrated, the average length of the antecedent for example embodiments (particularly for only the top 10 rules of example embodiments) is less than for the unfiltered results and the other filtering schemes. Further, the total impact value is 100.00% for example embodiments, while maintaining a relatively small number of rules (59 for the complete CS filtering set) relative to the number of unfiltered rules (107,147 rules for the unfiltered results).

In FIG. 3F, the results of the rule filtering techniques described herein (labeled as "CS filtering" to represent "cover set filtering" in FIG. 3F) as applied to the 4G dataset described above are compared to unfiltered results and results generated by FB filtering, HC filtering, and FAR filtering. In addition to the results generated by the rule filtering techniques described herein, the results for only the top 10 rules (according to impact value) of example embodiments described herein (labeled as "CS filtering @ top10" in FIG. 3F) are also shown for comparison. As illustrated, the average length of the antecedent for example embodiments is less than for the unfiltered results and the other filtering schemes. Further, the total impact value is 50.79% for example embodiments, while maintaining a relatively small number of rules (42 for the complete CS filtering set) relative to the number of unfiltered rules (511 rules for the unfiltered results).

Figure 3G:
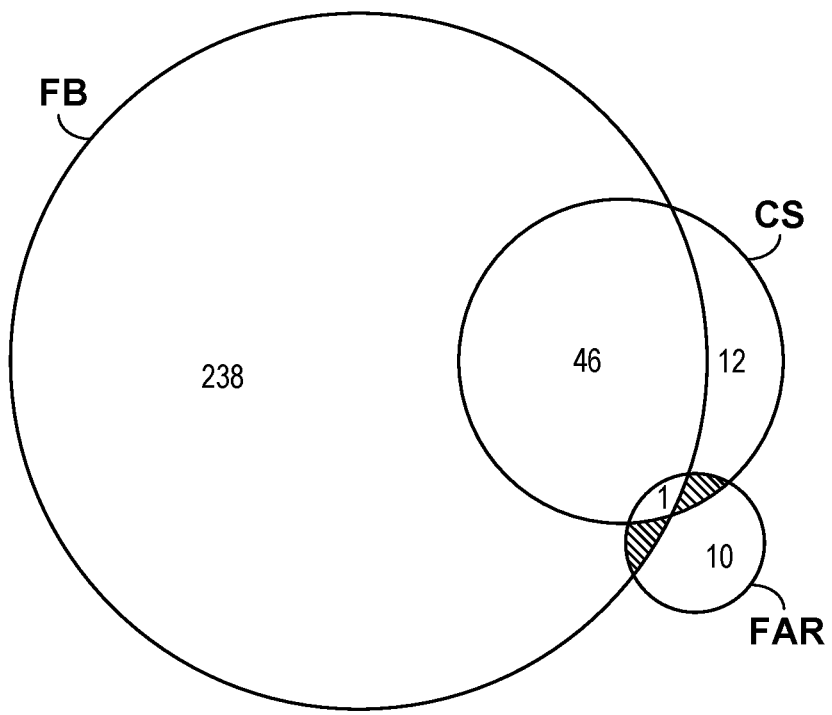
FIG. 3G depicts experimental results, in accordance with example embodiments.

In FIG. 3G, the overlap of the rules resulting from the rule filtering techniques described herein (labeled as "CS" to represent "cover set" in FIG. 3G) with the rules resulting from FB filtering and FAR filtering are shown. The rule overlap in FIG. 3G is an illustration based on each of the rule filtering techniques as applied to the 3G dataset described above. A rule from one filtering technique is considered to be similar enough to a rule from another filtering technique so as to warrant an overlap in the illustration if the rules from the two filtering techniques have the same antecedent and consequent. As illustrated, there are 46 rules that overlap only between the example embodiments described herein and the FB filtering technique. Further, there is 1 rule that overlaps between the example embodiments described herein, the FB filtering technique, and the FAR filtering technique. Still further, there are no rules that overlap between the example embodiments described herein and the HC filtering technique. Lastly, there are 12 rules resulting from the example embodiments described herein that do not overlap with any of the rules generated by other filtering techniques.

Figure 3H:
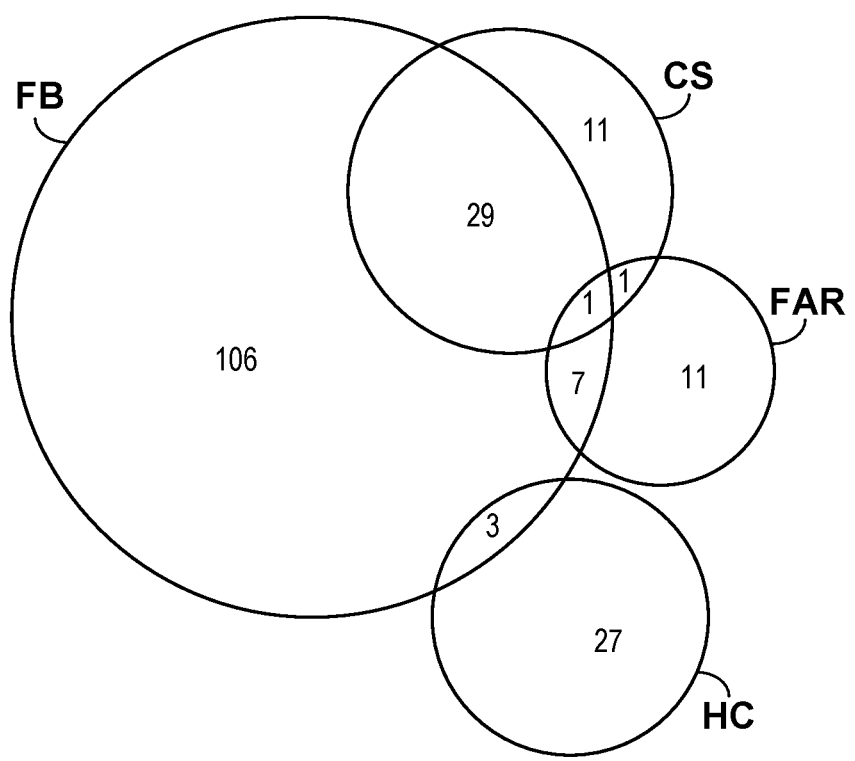
FIG. 3H depicts experimental results, in accordance with example embodiments.

In FIG. 3H, the overlap of the rules resulting from the rule filtering techniques described herein (labeled as "CS" to represent "cover set" in FIG. 3H) with the rules resulting from FB filtering, FAR filtering, and HC filtering are shown. The rule overlap in FIG. 3H is an illustration based on each of the rule filtering techniques as applied to the 4G dataset described above. A rule from one filtering technique is considered to be similar enough to a rule from another filtering technique so as to warrant an overlap in the illustration if the rules from the two filtering techniques have the same antecedent and consequent. As illustrated, there are 29 rules that overlap only between the example embodiments described herein and the FB filtering technique. Further, there is 1 rule that overlaps only between the example embodiments described herein, the FB filtering technique, and the FAR filtering technique. Additionally, there is 1 rule that only overlaps between the example embodiments described herein and the FAR filtering technique. Still further, there are no rules that overlap between the example embodiments described herein and the HC filtering technique. Lastly, there are 11 rules resulting from the example embodiments described herein that do not overlap with any of the rules generated by other filtering techniques.

IV. Example Operations

Figure 4:
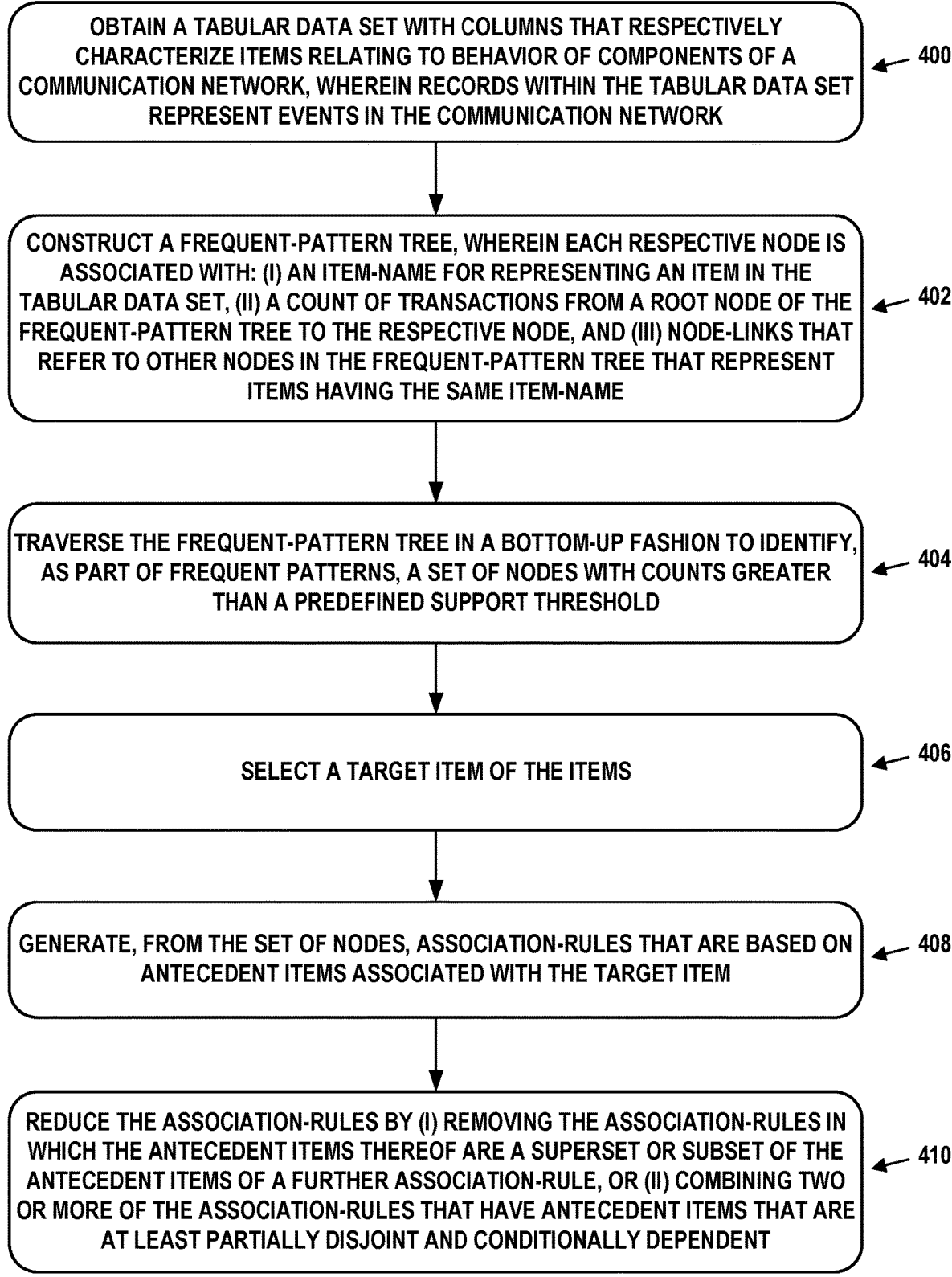
FIG. 4 is a flow chart, in accordance with example embodiments.

FIG. 4 is a flow chart illustrating an example embodiment. The process illustrated by FIG. 4 may be carried out by a computing system and/or a cluster of computing systems, such as a server cluster. However, the process can be carried out by other types of devices or device subsystems. For example, the process could be carried out by a laptop or a tablet device.

The embodiments of FIG. 4 may be simplified by the removal of any one or more of the features shown therein. Further, these embodiments may be combined with features, aspects, and/or implementations of any of the previous figures or otherwise described herein.

Block 400 may involve obtaining a tabular data set with columns that respectively characterize items relating to behavior of components of a communication network, wherein records within the tabular data set represent events in the communication network.

Block 402 may involve constructing a frequent-pattern tree, wherein each respective node is associated with: (i) an item-name for representing an item in the tabular data set, (ii) a count of transactions from a root node of the frequent-pattern tree to the respective node, and (iii) node-links that refer to other nodes in the frequent-pattern tree that represent items having the same item-name.

Block 404 may involve traversing the frequent-pattern tree in a bottom-up fashion to identify, as part of frequent patterns, a set of nodes with counts greater than a predefined support threshold.

Block 406 may involve selecting a target item of the items.

Block 408 may involve generating, from the set of nodes, association-rules that are based on antecedent items associated with the target item.

Block 410 may involve reducing the association-rules by (i) removing the association-rules in which the antecedent items thereof are a superset or subset of the antecedent items of a further association-rule, or (ii) combining two or more of the association-rules that have antecedent items that are at least partially disjoint and conditionally dependent.

Some embodiments may involve determining, from the association-rules, respective confidence values each representing a likelihood that the antecedent items of a given association-rule are is associated with the target item of the given association-rule.

Some embodiments may involve organizing numerical values within the tabular data into bins, and reducing the association-rules by combining association-rules with adjacent bins and respective confidence values that are within a predetermined range.

In some embodiments, removing the association-rules may include determining that the association-rules to remove have confidence values that are within a predetermined range of that of the further association-rule.

In some embodiments, combining two or more of the association-rules may include determining that the two or more of the association-rules have respective confidence values that are within a predetermined range.

In some embodiments, each of the antecedent items and the target item respectively appear in the columns of the tabular data set.

In some embodiments, each of the antecedent items and the target item specify information about an event or state in the communication network.

In some embodiments, generating the association-rules may include storing, in a memory, the association-rules. In the embodiments, reducing the association-rules may include deleting, from the memory, any association rules that are redundant due to the removing or the combining.

Some embodiments may involve providing for display the association-rules as reduced, wherein the antecedent items thereof are identified as possible causes of events or states within the communication network involving the target item. In these embodiments, providing for display the association-rules as reduced may include transmitting a representation of the association-rules as reduced to a client device.

V. Example Computing Environment

Figure 5:
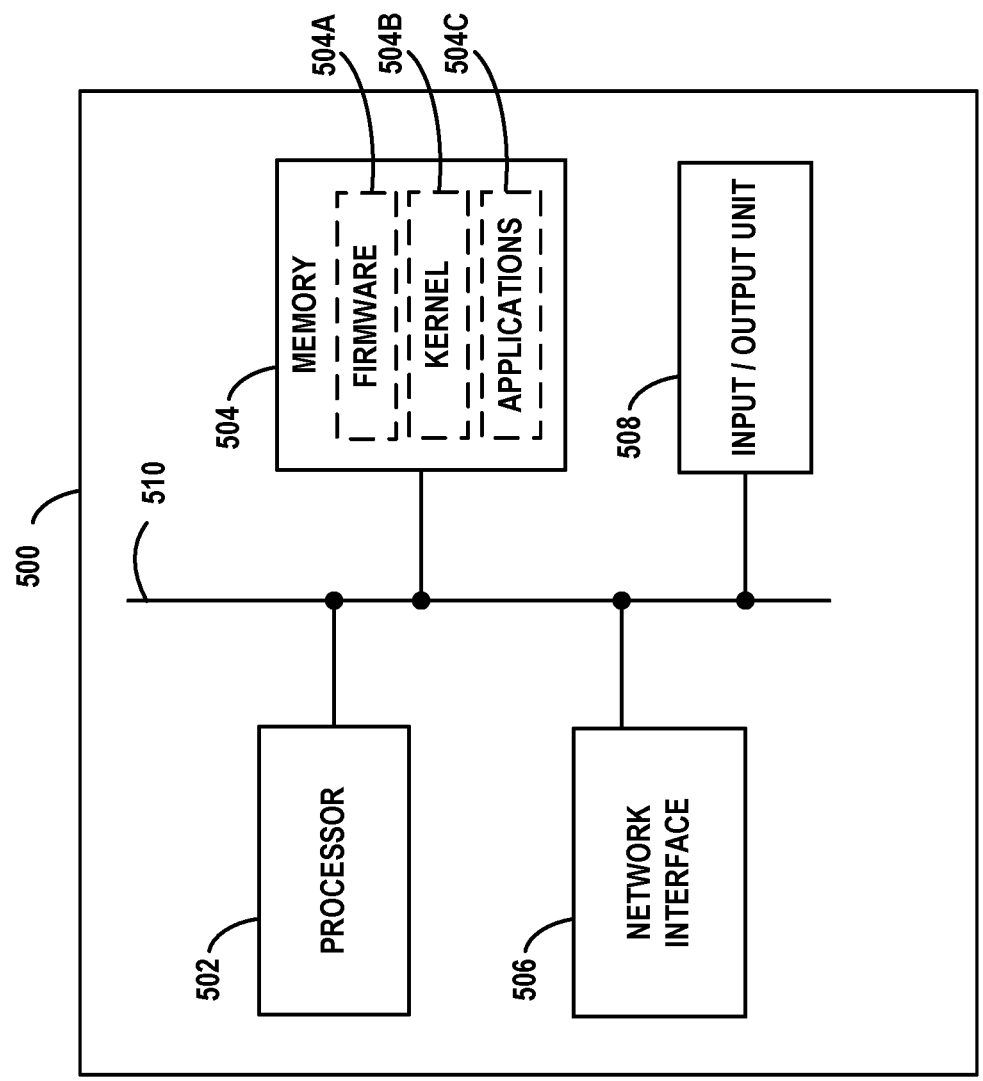
FIG. 5 illustrates a schematic drawing of a computing device, in accordance with example embodiments.

FIG. 5 is a simplified block diagram exemplifying a computing device 500, illustrating some of the components that could be included in a computing device arranged to operate in accordance with the embodiments herein. Computing device 500 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 500 includes processor 502, memory 504, network interface 506, and input/output unit 508, all of which may be coupled by system bus 510 or a similar mechanism. In some embodiments, computing device 500 may include other components and/or peripheral devices (e.g., detachable storage, printers, and so on).

Processor 502 may be one or more of any type of computer processing element, such as a CPU, a co-processor (e.g., a mathematics, graphics, or encryption co-processor), a digital signal processor (DSP), a network processor, and/or a form of integrated circuit or controller that performs processor operations. In some cases, processor 502 may be one or more single-core processors. In other cases, processor 502 may be one or more multi-core processors with multiple independent processing units. Processor 502 may also include register memory for temporarily storing instructions being executed and related data, as well as cache memory for temporarily storing recently-used instructions and data.

Memory 504 may be any form of computer-usable memory, including but not limited to RAM, read-only memory (ROM), and non-volatile memory (e.g., flash memory, hard disk drives, solid state drives, compact discs (CDs), digital video discs (DVDs), and/or tape storage). Thus, memory 504 represents both main memory units, as well as long-term storage. Other types of memory may include biological memory.

Memory 504 may store program instructions and/or data on which program instructions may operate. By way of example, memory 504 may store these program instructions on a non-transitory, computer-readable medium, such that the instructions are executable by processor 502 to carry out any of the methods, processes, or operations disclosed in this specification or the accompanying drawings.

As shown in FIG. 5, memory 504 may include firmware 504A, kernel 504B, and/or applications 504C. Firmware 504A may be program code used to boot or otherwise initiate some or all of computing device 500. Kernel 504B may be an operating system, including modules for memory management, scheduling, and management of processes, input/output, and communication. Kernel 504B may also include device drivers that allow the operating system to communicate with the hardware modules (e.g., memory units, networking interfaces, ports, and buses) of computing device 500. Applications 504C may be one or more user-space software programs, such as web browsers or email clients, as well as any software libraries used by these programs. Notably, applications 504C may include one or more programs configured to carry out the embodiments herein. Memory 504 may also store data used by these and other programs and applications.

Network interface 506 may take the form of one or more wireline interfaces, such as Ethernet (e.g., Fast Ethernet, Gigabit Ethernet, and so on). Network interface 506 may also support communication over one or more non-Ethernet media, such as coaxial cables or power lines, or over wide-area media, such as Synchronous Optical Networking (SONET) or digital subscriber line (DSL) technologies. Network interface 506 may additionally take the form of one or more wireless interfaces, such as IEEE 802.11 (WIFI), BLUETOOTH®, global positioning system (GPS), or a wide-area wireless interface. However, other forms of physical layer interfaces and other types of standard or proprietary communication protocols may be used over network interface 506. Furthermore, network interface 506 may include multiple physical interfaces. For instance, some embodiments of computing device 500 may include Ethernet, BLUETOOTH®, and Wifi interfaces.

Input/output unit 508 may facilitate user and peripheral device interaction with computing device 500. Input/output unit 508 may include one or more types of input devices, such as a keyboard, a mouse, a touch screen, and so on. Similarly, input/output unit 508 may include one or more types of output devices, such as a screen, monitor, printer, and/or one or more light emitting diodes (LEDs). Additionally or alternatively, computing device 500 may communicate with other devices using a universal serial bus (USB) or high-definition multimedia interface (HDMI) port interface, for example.

In some embodiments, one or more computing devices like computing device 500 may be deployed to support the embodiments herein. The exact physical location, connectivity, and configuration of these computing devices may be unknown and/or unimportant to client devices. Accordingly, the computing devices may be referred to as "cloud-based" devices that may be housed at various remote data center locations.

Figure 6:
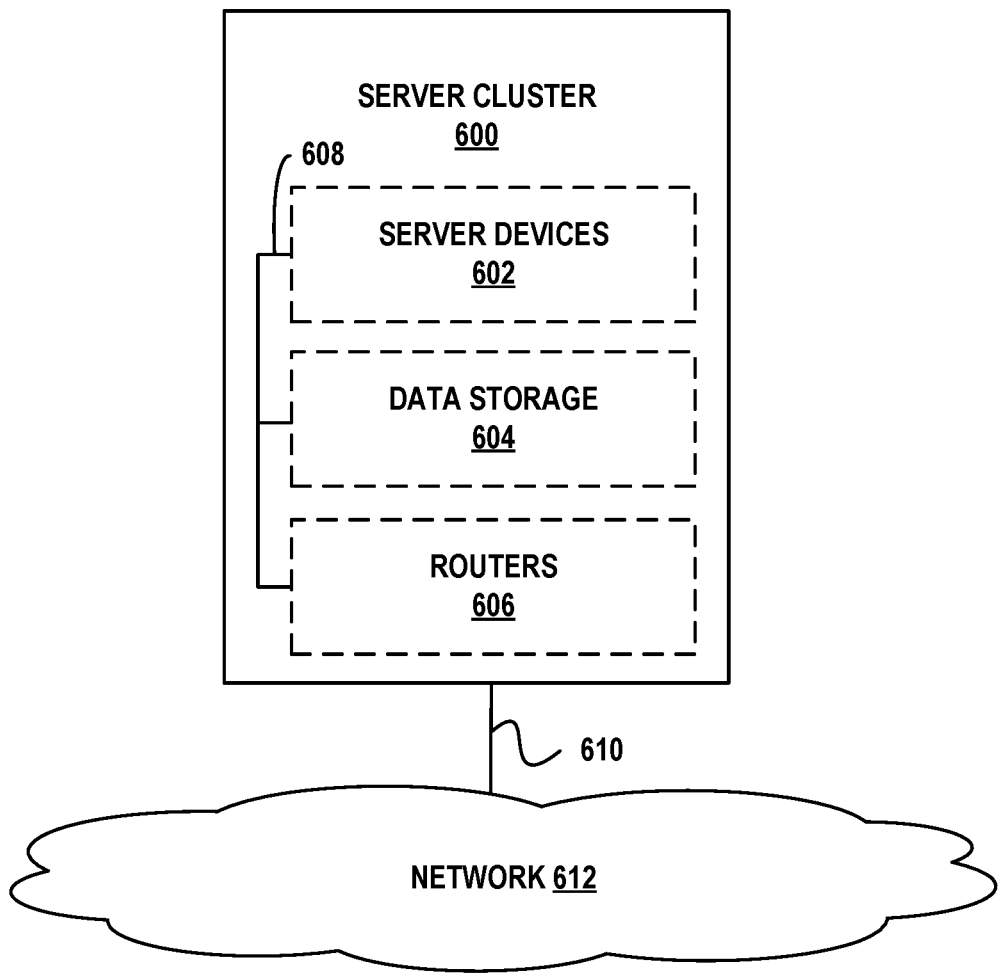
FIG. 6 illustrates a schematic drawing of a server device cluster, in accordance with example embodiments.

FIG. 6 depicts a cloud-based server cluster 600 in accordance with example embodiments. In FIG. 6, operations of a computing device (e.g., computing device 500) may be distributed between server devices 602, data storage 604, and routers 606, all of which may be connected by local cluster network 608. The number of server devices 602, data storages 604, and routers 606 in server cluster 600 may depend on the computing task(s) and/or applications assigned to server cluster 600.

For example, server devices 602 can be configured to perform various computing tasks of computing device 500. Thus, computing tasks can be distributed among one or more of server devices 602. To the extent that these computing tasks can be performed in parallel, such a distribution of tasks may reduce the total time to complete these tasks and return a result. For purposes of simplicity, both server cluster 600 and individual server devices 602 may be referred to as a "server device." This nomenclature should be understood to imply that one or more distinct server devices, data storage devices, and cluster routers may be involved in server device operations.

Data storage 604 may be data storage arrays that include drive array controllers configured to manage read and write access to groups of hard disk drives and/or solid state drives. The drive array controllers, alone or in conjunction with server devices 602, may also be configured to manage backup or redundant copies of the data stored in data storage 604 to protect against drive failures or other types of failures that prevent one or more of server devices 602 from accessing units of data storage 604. Other types of memory aside from drives may be used.

Routers 606 may include networking equipment configured to provide internal and external communications for server cluster 600. For example, routers 606 may include one or more packet-switching and/or routing devices (including switches and/or gateways) configured to provide (i) network communications between server devices 602 and data storage 604 via local cluster network 608, and/or (ii) network communications between server cluster 600 and other devices via communication link 610 to network 612.

Additionally, the configuration of routers 606 can be based at least in part on the data communication requirements of server devices 602 and data storage 604, the latency and throughput of the local cluster network 608, the latency, throughput, and cost of communication link 610, and/or other factors that may contribute to the cost, speed, fault-tolerance, resiliency, efficiency, and/or other design goals of the system architecture.

As a possible example, data storage 604 may include any form of database, such as a structured query language (SQL) database. Various types of data structures may store the information in such a database, including but not limited to tables, arrays, lists, trees, and tuples. Furthermore, any databases in data storage 604 may be monolithic or distributed across multiple physical devices.

Server devices 602 may be configured to transmit data to and receive data from data storage 604. This transmission and retrieval may take the form of SQL queries or other types of database queries, and the output of such queries, respectively. Additional text, images, video, and/or audio may be included as well. Furthermore, server devices 602 may organize the received data into web page or web application representations. Such a representation may take the form of a markup language, such as the hypertext markup language (HTML), the extensible markup language (XML), or some other standardized or proprietary format. Moreover, server devices 602 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality

VI. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
obtaining a tabular data set with columns that respectively characterize items relating to behavior of components of a communication network, wherein records within the tabular data set represent events in the communication network;
constructing a frequent-pattern tree, wherein each respective node is associated with: (i) an item-name for representing an item in the tabular data set, (ii) a count of transactions from a root node of the frequent-pattern tree to the respective node, and (iii) node-links that refer to other nodes in the frequent-pattern tree that represent items having the same item-name;
traversing the frequent-pattern tree in a bottom-up fashion to identify, as part of frequent patterns, a set of nodes with counts greater than a predefined support threshold;
selecting a target item of the items;
generating, from the set of nodes, association-rules that are based on antecedent items associated with the target item; and
reducing the association-rules by combining two or more of the association-rules that have antecedent items that are at least partially disjoint and conditionally dependent.

2. The computer-implemented method for claim 1, further comprising:
determining, from the association-rules, respective confidence values each representing a likelihood that the antecedent items of a given association-rule are associated with the target item of the given association-rule.

3. The computer-implemented method of claim 2, further comprising:
organizing numerical values within the tabular data into bins; and
reducing the association-rules by combining groups of the association-rules with adjacent bins and confidence values that are within a predetermined range.

4. The computer-implemented method of claim 2, further comprising reducing the association-rules by removing the association-rules in which the antecedent items thereof are a superset or subset of the antecedent items of a further association-rule, wherein removing the association-rules comprises determining that the association-rules to remove have confidence values that are within a predetermined range of that of the further association-rule.

5. The computer-implemented method of claim 2, wherein combining two or more of the association-rules comprises determining that the two or more of the association-rules have confidence values that are within a predetermined range.

6. The computer-implemented method of claim 1, wherein each of the antecedent items and the target item respectively appear in the columns of the tabular data set, and wherein each of the antecedent items and the target item specify information about an event or state in the communication network.

7. The computer-implemented method of claim 1, wherein combining two or more of the association-rules that have antecedent items that are at least partially disjoint and conditionally dependent comprises determining whether two or more of the association-rules have antecedent items that are at least partially disjoint and conditionally dependent by:
 determining a first value, wherein the first value corresponds to an absolute value of a difference between a first confidence value and a second confidence value, and wherein the first confidence value is associated with a first association-rule and the second confidence value is associated with a second association-rule;
 determining a second value, wherein the second value corresponds to a quotient between: (i) an absolute value of a difference between a first cover value and a second cover value and (ii) the second cover value, wherein the first cover value is a cover value of a union between the antecedent item of the first association-rule and the antecedent item of the second association-rule, and wherein the second cover value is a cover value of the antecedent item of the first association-rule;
 determining a third value, wherein the third value corresponds to a quotient between: (i) an absolute value of a difference between the first cover value and a third cover value and (ii) the second cover value, and wherein the third cover value is a cover value of the antecedent item of the second association-rule;
 comparing the first value to a confidence threshold;
 comparing the second value to a support threshold; and
 comparing the third value to the support threshold.

8. The computer-implemented method of claim 1, wherein generating the association-rules comprises storing, in a memory, the association-rules.

9. The computer-implemented method of claim 8, wherein reducing the association-rules comprises deleting, from the memory, any of the association-rules that are redundant due to the combining.

10. The computer-implemented method of claim 1, further comprising:
 providing for display the association-rules as reduced, wherein the antecedent items thereof are identified as possible causes of the events or states within the communication network involving the target item.

11. The computer-implemented method of claim 10, wherein providing for display the association-rules as reduced comprises transmitting a representation of the association-rules as reduced to a client device.

12. An article of manufacture including a non-transitory, computer-readable medium, having stored thereon program instructions that, upon execution by a computing system, cause the computing system to perform operations comprising:
 obtaining a tabular data set with columns that respectively characterize items relating to behavior of components of a communication network, wherein records within the tabular data set represent events in the communication network;
 constructing a frequent-pattern tree, wherein each respective node is associated with: (i) an item-name for representing an item in the tabular data set, (ii) a count of transactions from a root node of the frequent-pattern tree to the respective node, and (iii) node-links that refer to other nodes in the frequent-pattern tree that represent items having the same item-name;
 traversing the frequent-pattern tree in a bottom-up fashion to identify, as part of frequent patterns, a set of nodes with counts greater than a predefined support threshold;
 selecting a target item of the items;
 generating, from the set of nodes, association-rules that are based on antecedent items associated with the target item; and
 reducing the association-rules by combining two or more of the association-rules that have antecedent items that are at least partially disjoint and conditionally dependent.

13. The article of manufacture of claim 12, wherein the operations performed by the computing system when executing the program instructions further comprise:
 determining, from the association-rules, respective confidence values each representing a likelihood that the antecedent items of a given association-rule are is associated with the target item of the given association-rule.

14. The article of manufacture of claim 13, wherein the operations performed by the computing system when executing the program instructions further comprise:
 organizing numerical values within the tabular data into bins; and
 reducing the association-rules by combining groups of the association-rules with adjacent bins and confidence values that are within a predetermined range.

15. The article of manufacture of claim 13, wherein the operations performed by the computing system when executing the program instructions further comprise reducing the association-rules by removing the association-rules in which the antecedent items thereof are a superset or subset of the antecedent items of a further association-rule, and wherein removing the association-rules comprises determining that the association-rules to remove have confidence values that are within a predetermined range of that of the further association-rule.

16. The article of manufacture of claim 13, wherein combining two or more of the association-rules comprises determining that the two or more of the association-rules have confidence values that are within a predetermined range.

17. The article of manufacture of claim 12, wherein each of the antecedent items and the target item respectively appear in the columns of the tabular data set, wherein each of the antecedent items and the target item specify information about an event or state in the communication network.

18. The article of manufacture of claim 12, wherein combining two or more of the association-rules that have antecedent items that are at least partially disjoint and conditionally dependent comprises determining whether two or more of the association-rules have antecedent items that are at least partially disjoint and conditionally dependent by:
 determining a first value, wherein the first value corresponds to an absolute value of a difference between a first confidence value and a second confidence value, and wherein the first confidence value is associated with a first association-rule and the second confidence value is associated with a second association-rule;
 determining a second value, wherein the second value corresponds to a quotient between: (i) an absolute value of a difference between a first cover value and a second cover value and (ii) the second cover value, wherein the first cover value is a cover value of a union between the antecedent item of the first association-rule and the antecedent item of the second association-rule, and wherein the second cover value is a cover value of the antecedent item of the first association-rule;
 determining a third value, wherein the third value corresponds to a quotient between: (i) an absolute value of a difference between the first cover value and a third cover value and (ii) the second cover value, and wherein the third cover value is a cover value of the antecedent item of the second association-rule;

comparing the first value to a confidence threshold;

comparing the second value to a support threshold; and comparing the third value to the support threshold.

19. The article of manufacture of claim 12, wherein generating the association-rules comprises storing, in a memory, the association-rules.

20. A computing system comprising:

one or more processors; and memory containing program instructions that, when executed by the one or more processors, cause the computing system to perform operations comprising:

obtaining a tabular data set with columns that respectively characterize items relating to behavior of components of a communication network, wherein records within the tabular data set represent events in the communication network;

constructing a frequent-pattern tree, wherein each respective node is associated with: (i) an item-name for representing an item in the tabular data set, (ii) a count of transactions from a root node of the frequent-pattern tree to the respective node, and (iii) node-links that refer to other nodes in the frequent-pattern tree that represent items having the same item-name;

traversing the frequent-pattern tree in a bottom-up fashion to identify, as part of frequent patterns, a set of nodes with counts greater than a predefined support threshold;

selecting a target item of the items;

generating, from the set of nodes, association-rules that are based on antecedent items associated with the target item; and reducing the association-rules by combining two or more of the association-rules that have antecedent items that are at least partially disjoint and conditionally dependent.

* * * * *